(12) United States Patent
Xia et al.

(10) Patent No.: US 9,063,528 B2
(45) Date of Patent: Jun. 23, 2015

(54) SET OF SENSOR UNITS FOR COMMUNICATION ENABLED FOR STREAMING MEDIA DELIVERY WITH MONITORING AND CONTROL OF POWER USAGE OF CONNECTED APPLIANCES

(71) Applicant: ASOKA USA CORPORATION, Santa Clara, CA (US)

(72) Inventors: Mingyao Xia, Shenzhen (CN); Eric Grubel, Thousand Oaks, CA (US); Dan Castellano, Cupertino, CA (US)

(73) Assignee: ASOKA USA CORPORATION, Santa Clara, CA (US)

( * ) Notice: Subject to any disclaimer, the term of this patent is extended or adjusted under 35 U.S.C. 154(b) by 0 days.

(21) Appl. No.: 13/725,197

(22) Filed: Dec. 21, 2012

(65) Prior Publication Data

US 2013/0184879 A1   Jul. 18, 2013

Related U.S. Application Data

(63) Continuation of application No. 13/153,194, filed on Jun. 3, 2011, now Pat. No. 8,364,326, which is a continuation-in-part of application No. 13/032,454, filed on Feb. 22, 2011, now Pat. No. 8,755,946.

(51) Int. Cl.
  *G05B 13/02*   (2006.01)
  *H02J 13/00*   (2006.01)

(52) U.S. Cl.
  CPC ............ *G05B 13/02* (2013.01); *H02J 13/0024* (2013.01); *H02J 13/0055* (2013.01);
  (Continued)

(58) Field of Classification Search
  CPC ............... G05B 13/023; H02J 13/0024; H02J 13/0055; H02J 13/0082; Y02B 90/244; Y02B 90/2615; Y02B 90/2623; Y02B 90/2669; Y04S 20/327; Y04S 40/121; Y04S 40/122; Y04S 40/128

USPC ........ 709/224; 700/94, 276, 282, 295, 297, 9, 700/19, 22, 286, 291; 315/297; 340/12.32
See application file for complete search history.

(56) References Cited

U.S. PATENT DOCUMENTS 5,090,024 A   2/1992   Vander Mey et al.
5,553,072 A   9/1996   Daggett et al.
(Continued)

OTHER PUBLICATIONS

Heile, , "Smart Grids for Green Communcations", IEEE Wireless Communications, Jun. 2010, pp. 4-6 (online). Retrieved on Jul. 4, 2012, internet URL:,http://dl.comsoc.org/livepubs/pci/public/2010/jun/pdf/wciindpersp.pdf>, entire document, 4-6.

*Primary Examiner* — Charles Kasenge
(74) *Attorney, Agent, or Firm* — Michael A. Glenn; Perkins Coie LLP

(57) ABSTRACT

A group of sensor devices is connected to the power line and configured for collecting power usage information and enabling power management to reduce the carbon footprint of the home, as well as to provide local area networking. In one embodiment, the devices include an intelligent master sensor and its sub-sets, such as a communication and power management sensor and a power control switch sensor. The master device is configured to collect, compile, and communicate the collected data via the web or other communication medium to the outside world. The master device also receives and distributes control instructions that are used to control the power usage via the associated switches in the home or office. The sensors are used in the home or office environment to provide integrated sensing and control of home power usage and power management, while establishing a LAN having communication capability, including streaming media delivery capability.

15 Claims, 12 Drawing Sheets

(52) U.S. Cl.
CPC ............ *H02J13/0082* (2013.01); *Y02B 90/244* (2013.01); *Y02B 90/2669* (2013.01); *Y02B 90/2623* (2013.01); *Y02B 90/2615* (2013.01); *Y04S 20/327* (2013.01); *Y04S 40/121* (2013.01); *Y04S 40/122* (2013.01); *Y04S 40/128* (2013.01)

(56) References Cited

U.S. PATENT DOCUMENTS

| | | |
|---|---|---|
| 5,572,438 A | 11/1996 | Ehlers et al. |
| 5,630,204 A | 5/1997 | Hylton et al. |
| 5,999,612 A | 12/1999 | Dunn et al. |
| 6,252,883 B1 | 6/2001 | Schweickart et al. |
| 6,378,131 B2 | 4/2002 | Cunningham et al. |
| 6,553,418 B1 | 4/2003 | Collins et al. |
| 6,633,823 B2 | 10/2003 | Bartone et al. |
| 6,826,607 B1 * | 11/2004 | Gelvin et al. ............... 709/224 |
| 6,854,059 B2 | 2/2005 | Gardner |
| 6,882,709 B1 | 4/2005 | Sherlock et al. |
| 6,956,464 B2 | 10/2005 | Wang et al. |
| 6,961,641 B1 | 11/2005 | Forth et al. |
| 6,988,025 B2 | 1/2006 | Ransom et al. |
| 6,990,395 B2 | 1/2006 | Ransom et al. |
| 6,993,417 B2 | 1/2006 | Osann, Jr. |
| 7,020,701 B1 * | 3/2006 | Gelvin et al. ............... 709/224 |
| 7,113,763 B2 | 9/2006 | Heinonen et al. |
| 7,136,936 B2 | 11/2006 | Chan et al. |
| 7,142,094 B1 | 11/2006 | Davidow et al. |
| 7,173,938 B1 | 2/2007 | Davidow |
| 7,194,528 B1 | 3/2007 | Davidow |
| 7,231,280 B2 | 6/2007 | Costa |
| 7,231,281 B2 | 6/2007 | Costa |
| 7,245,472 B2 | 7/2007 | Davidow |
| 7,319,717 B2 | 1/2008 | Zitting |
| 7,345,998 B2 | 3/2008 | Cregg et al. |
| 7,363,398 B2 | 4/2008 | Scott |
| 7,415,541 B2 | 8/2008 | Chan et al. |
| 7,423,546 B1 * | 9/2008 | Aisa ............................... 340/679 |
| 7,444,401 B1 | 10/2008 | Keyghobad |
| 7,461,174 B2 | 12/2008 | Chan et al. |
| 7,463,986 B2 | 12/2008 | Hayes |
| 7,688,841 B2 | 3/2010 | Binder |
| 7,690,949 B2 | 4/2010 | Binder |
| 7,701,331 B2 | 4/2010 | Tran |
| 7,734,380 B2 | 6/2010 | Ransom et al. |
| 7,734,572 B2 | 6/2010 | Wiemeyer et al. |
| 7,738,999 B2 | 6/2010 | Petite |
| 7,751,795 B2 | 7/2010 | Mccarty et al. |
| 7,752,309 B2 | 7/2010 | Keyghobad et al. |
| 7,769,907 B2 | 8/2010 | Chan |
| 7,769,908 B2 | 8/2010 | Chan et al. |
| 7,773,361 B2 | 8/2010 | Davidow |
| 7,778,152 B2 | 8/2010 | Chan |
| 7,825,793 B1 | 11/2010 | Spillman et al. |
| 7,826,395 B2 | 11/2010 | Kim |
| 7,848,759 B2 | 12/2010 | Kim et al. |
| 8,213,895 B2 | 7/2012 | Hurwitz et al. |
| 8,306,634 B2 | 11/2012 | Nguyen et al. |
| 8,364,326 B2 * | 1/2013 | Xia et al. .................... 700/295 |
| 8,503,150 B2 | 8/2013 | Chang |
| 2002/0023267 A1 | 2/2002 | Hoang |
| 2002/0026646 A1 | 2/2002 | Hoang |
| 2002/0114336 A1 | 8/2002 | Chow |
| 2002/0165943 A1 | 11/2002 | Hoang |
| 2002/0170059 A1 | 11/2002 | Hoang |
| 2003/0050737 A1 | 3/2003 | Osann, Jr. |
| 2004/0070912 A1 * | 4/2004 | Kopp ........................... 361/119 |
| 2004/0138786 A1 | 7/2004 | Blacket et al. |
| 2004/0139472 A1 | 7/2004 | Furet et al. |
| 2004/0148632 A1 | 7/2004 | Park et al. |
| 2004/0155985 A1 | 8/2004 | Dethier et al. |
| 2004/0193329 A1 | 9/2004 | Ransom et al. |
| 2004/0203989 A1 | 10/2004 | Karaoguz |
| 2004/0212481 A1 | 10/2004 | Abraham |
| 2005/0008345 A1 | 1/2005 | Choi |
| 2005/0018766 A1 | 1/2005 | Iwamura |
| 2005/0030968 A1 | 2/2005 | Rich et al. |
| 2005/0157215 A1 | 7/2005 | Minnick et al. |
| 2005/0160467 A1 | 7/2005 | Moons et al. |
| 2005/0184867 A1 | 8/2005 | Osann, Jr. |
| 2005/0207079 A1 | 9/2005 | Tiller et al. |
| 2005/0272402 A1 | 12/2005 | Ferentz et al. |
| 2006/0049694 A1 * | 3/2006 | Kates .......................... 307/132 E |
| 2006/0083206 A1 | 4/2006 | Min |
| 2006/0088149 A1 | 4/2006 | Sung |
| 2006/0099954 A1 | 5/2006 | Henderson et al. |
| 2006/0168624 A1 | 7/2006 | Carney et al. |
| 2006/0227884 A1 | 10/2006 | Koga et al. |
| 2007/0043477 A1 | 2/2007 | Ehlers |
| 2007/0061487 A1 | 3/2007 | Moore et al. |
| 2007/0130598 A1 | 6/2007 | Choi et al. |
| 2007/0132579 A1 | 6/2007 | Kim |
| 2007/0183543 A1 | 8/2007 | Lu |
| 2007/0204286 A1 | 8/2007 | Candelore |
| 2007/0213879 A1 * | 9/2007 | Iwamura ...................... 700/292 |
| 2007/0229231 A1 | 10/2007 | Hurwitz et al. |
| 2007/0233323 A1 | 10/2007 | Wiemeyer et al. |
| 2007/0250900 A1 | 10/2007 | Marcuvitz |
| 2008/0015740 A1 | 1/2008 | Osann, Jr. |
| 2008/0024605 A1 | 1/2008 | Osann, Jr. |
| 2008/0106146 A1 * | 5/2008 | Baek et al. ................... 307/35 |
| 2008/0130640 A1 | 6/2008 | Hurwitz |
| 2008/0137572 A1 | 6/2008 | Park et al. |
| 2008/0221737 A1 | 9/2008 | Josephson et al. |
| 2008/0259888 A1 | 10/2008 | Terashima |
| 2008/0317070 A1 | 12/2008 | Propp et al. |
| 2009/0040057 A1 | 2/2009 | Keyghobad et al. |
| 2009/0099629 A1 * | 4/2009 | Carson et al. ................ 607/96 |
| 2009/0117915 A1 | 5/2009 | Lee et al. |
| 2009/0135848 A1 | 5/2009 | Chan et al. |
| 2009/0175321 A1 | 7/2009 | Sasaki et al. |
| 2009/0182862 A1 | 7/2009 | Thomson et al. |
| 2009/0187499 A1 * | 7/2009 | Mulder et al. ................ 705/30 |
| 2009/0190553 A1 | 7/2009 | Masuda et al. |
| 2009/0195349 A1 | 8/2009 | Frader-Thompson et al. |
| 2009/0225679 A1 | 9/2009 | Bims |
| 2009/0287838 A1 | 11/2009 | Keyghobad et al. |
| 2009/0287966 A1 | 11/2009 | Keyghobad et al. |
| 2009/0319853 A1 | 12/2009 | Keyghobad et al. |
| 2010/0027599 A1 | 2/2010 | Di Chiro et al. |
| 2010/0070217 A1 | 3/2010 | Shimada et al. |
| 2010/0075661 A1 | 3/2010 | Li |
| 2010/0076701 A1 | 3/2010 | Harish |
| 2010/0091745 A1 | 4/2010 | Bevan et al. |
| 2010/0094475 A1 | 4/2010 | Masters et al. |
| 2010/0095335 A1 | 4/2010 | Wilson et al. |
| 2010/0097528 A1 | 4/2010 | Seo |
| 2010/0102987 A1 | 4/2010 | Lou et al. |
| 2010/0105336 A1 | 4/2010 | Attar et al. |
| 2010/0106342 A1 | 4/2010 | Ko et al. |
| 2010/0121968 A1 | 5/2010 | Clark |
| 2010/0128711 A1 | 5/2010 | Klein et al. |
| 2010/0138066 A1 | 6/2010 | Kong |
| 2010/0156666 A1 | 6/2010 | Choi et al. |
| 2010/0169940 A1 | 7/2010 | Howarter et al. |
| 2010/0182160 A1 | 7/2010 | Lu |
| 2010/0204850 A1 | 8/2010 | Henderieckx |
| 2010/0207728 A1 * | 8/2010 | Roscoe et al. ............... 340/10.1 |
| 2010/0217449 A1 | 8/2010 | Musti et al. |
| 2010/0228601 A1 * | 9/2010 | Vaswani et al. .............. 705/10 |
| 2010/0233975 A1 | 9/2010 | Wu et al. |
| 2010/0241245 A1 | 9/2010 | Wiemeyer et al. |
| 2010/0250497 A1 * | 9/2010 | Redlich et al. ............... 707/661 |
| 2010/0292858 A1 * | 11/2010 | Iwamura ...................... 700/293 |
| 2010/0327766 A1 * | 12/2010 | Recker et al. ................ 315/291 |
| 2011/0035491 A1 * | 2/2011 | Gelvin et al. ................ 709/224 |
| 2011/0037589 A1 | 2/2011 | Liu et al. |
| 2011/0040785 A1 * | 2/2011 | Steenberg et al. ........... 707/769 |
| 2011/0054700 A1 | 3/2011 | Chan et al. |
| 2011/0054710 A1 | 3/2011 | Imes et al. |
| 2011/0066300 A1 | 3/2011 | Tyagi et al. |
| 2011/0077758 A1 * | 3/2011 | Tran et al. .................... 700/94 |
| 2011/0082599 A1 | 4/2011 | Shinde et al. |
| 2011/0087522 A1 | 4/2011 | Beaty et al. |
| 2011/0093221 A1 | 4/2011 | Dhanjal |

(56) References Cited

U.S. PATENT DOCUMENTS

| | | |
|---|---|---|
| 2011/0121654 A1* | 5/2011 | Recker et al. .................. 307/66 |
| 2011/0147190 A1 | 6/2011 | GaleWyrick et al. |
| 2011/0161251 A1 | 6/2011 | Carey et al. |
| 2011/0184581 A1 | 7/2011 | Storch et al. |
| 2011/0196547 A1* | 8/2011 | Park et al. .................... 700/296 |
| 2011/0202190 A1 | 8/2011 | Venkatakrishnan et al. |
| 2011/0202198 A1 | 8/2011 | Venkatakrishnan et al. |
| 2011/0202910 A1 | 8/2011 | Venkatakrishnan et al. |
| 2011/0215736 A1* | 9/2011 | Horbst et al. ................. 315/297 |
| 2011/0231320 A1 | 9/2011 | Irving |
| 2011/0238235 A1 | 9/2011 | Xia |
| 2011/0264291 A1 | 10/2011 | Le Roux et al. |
| 2011/0271317 A1 | 11/2011 | Xia et al. |
| 2011/0307109 A1 | 12/2011 | Sri-Jayantha |
| 2012/0001548 A1* | 1/2012 | Recker et al. .................. 315/86 |
| 2012/0053737 A1 | 3/2012 | Valluri et al. |
| 2012/0066023 A1 | 3/2012 | Xia |
| 2012/0271472 A1 | 10/2012 | Brunner et al. |

* cited by examiner

SET OF SENSOR UNITS FOR COMMUNICATION ENABLED FOR STREAMING MEDIA DELIVERY WITH MONITORING AND CONTROL OF POWER USAGE OF CONNECTED APPLIANCES

CROSS REFERENCE TO RELATED APPLICATIONS

This application is a continuation of U.S. patent application Ser. No. 13/153,194, Set of Sensor Units for Communication Enabled for Streaming Media Delivery with Monitoring and Control of Power Usage of Connected Appliances, filed 3 Jun. 2011, which was issued as U.S. Pat. No. 8,364,326 on 29 Jan. 2013, which is a continuation-in-part of U.S. patent application Ser. No. 13/032,454, Method and Apparatus For Using PLC-Based Sensor Units For Communication and Streaming Media Delivery, and For Monitoring and Control Of Power Usage Of Connected Appliances, filed 22 Feb. 2011, which was issued as U.S. Pat. No. 8,755,946 on 17 Jun. 2014, each of which is incorporated herein in its entirety by this reference thereto.

BACKGROUND OF THE INVENTION

1. Technical Field

The invention relates to power line networking that is enabled for communication and media streaming, with remote power monitoring and control capable devices for power usage monitoring and control within a local area network. In particular, the invention relates to reducing the carbon foot print footprint of in-home equipment by appropriate use of devices for power monitoring, data collection, and control and communication of said equipment over power lines.

2. Description of the Background Art

The use of power lines as a communications medium has been known from early in the 20$^{th}$ century. Due to the higher cost and other limitations for extending the connectivity, the use of such power line communication (PLC) systems has been limited to local area networks (LANs) within homes or offices or, at best, within apartment complexes. PLC has also found a limited number of applications where other types of communication methods do not provide the security and remote connectivity, such as for power line control applications.

Basic devices for connecting to the power line for communication and power supply have been designed and used to provide service within LANs. Due to more efficient competing technologies, the infrastructure for power line communication never developed to make it a mainstream technology. A number of patents and patent applications dating from the early 1900s exist that cover devices and systems for connectivity using power line communications. Despite this early start, PLC technology has not become a main stream communication technology and the adaptation of this technology has been slow. This can be attributed to various reasons including, the higher cost of available devices, the lack of suitable devices for communication using the PLC technology, etc. The result has been that PLC has not found a path for growth in the standard voice and data communication field catered to by technologies such as xDSL, cell phones, and satellite communications.

It is hence necessary to identify an application space where the power line communication technology can be optimally used and to develop devices and systems to cater to the application. Such a use that is emerging is the needed ability to collect information and provide remote control capability for appliances, for example to reduce the carbon footprint of the home. If this emerging application can simultaneously provide a local area network capability catering to the needs of communication and streaming media delivery within a home or office, it could be the optimum application for the growth technology. This application shows promise for the future growth and development of the PLC technology, but it is still necessary to develop and implement suitable sensor units and systems to cater to the needs of this technology and to bring forth its full potential.

SUMMARY OF THE INVENTION

A group of sensor devices is connected to the power line and configured for collecting power usage information and enabling power management to reduce the carbon footprint of the home, as well as to provide local area networking. In one embodiment of the invention, the devices include an intelligent master sensor and its sub-sets, such as a communication and power management sensor and a power control switch sensor. The master device is configured to collect, compile, and communicate the collected data via the web or other communication medium to the outside world. The master device also receives and distributes control instructions that are used to control the power usage via the associated switches in the home or office. The sensors are used in the home or office environment to provide integrated sensing and control of home power usage and power management, while establishing a LAN having communication capability, including streaming media delivery capability.

DETAILED DESCRIPTION OF THE INVENTION

Figure 1:
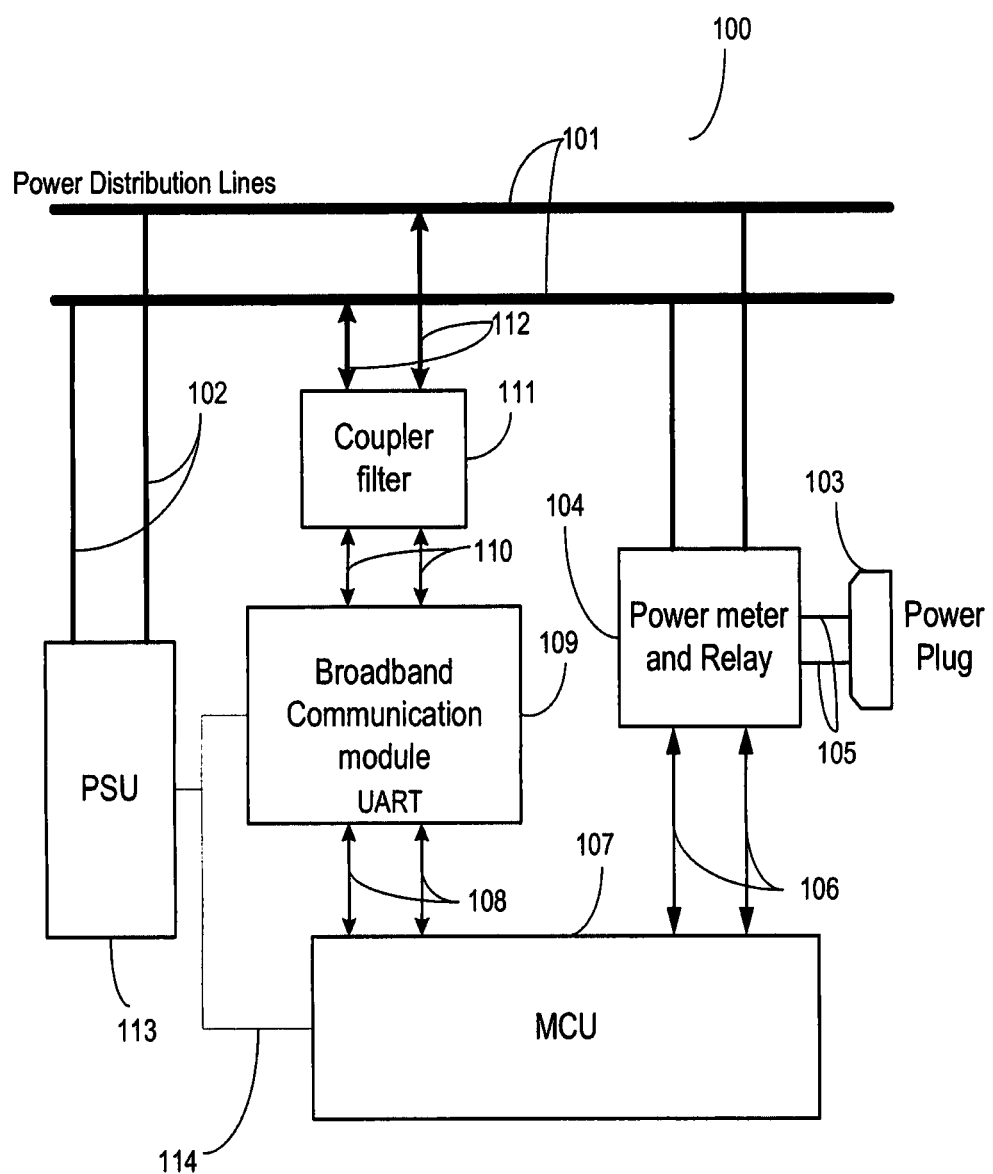
FIG. 1 is a block schematic diagram showing a power switch unit (SW) having broadband information transfer capability according to the invention.

Implementation of green technologies requires monitoring and control of the carbon footprint of homes and offices and has created a need to assess the power usage pattern and the magnitude of usage remotely, and to supervise and control the power remotely. It is necessary to monitor and control the power use on a micro level for the consumer, who can exercise the necessary constraints on use if the proper tools are provided. It is also necessary to monitor the usage pattern and collect data on a macro level to develop policies that are beneficial to the overall reduction of the carbon footprint at the home and office level, as well as on a national level. Empowering the individual and the society to exercise the necessary controls by monitoring the power usage is an area where the power line communication and control can be effectively and optimally used.

In an embodiment of the invention, a group of sensor devices is connected to the power line and configured for collecting power usage information and enabling power management to reduce the carbon footprint of the home, as well as to provide local area networking. In one embodiment of the invention, the devices include an intelligent master sensor and its sub-sets, such as a communication and power management sensor and a power control switch sensor. The master device is configured to collect, compile, and communicate the collected data via the web or other communication medium to the outside world. The master device also receives and distributes control instructions that are used to control the power usage via the associated switches in the home or office. The sensors are used in the home or office environment to provide integrated sensing and control of home power usage and power management, while establishing a LAN having communication capability, including streaming media delivery capability.

An embodiment of the invention comprises three different sensor units that, together, enable the collection of power usage information and that provide for remote control of power usage of appliances that are connected to the sensor units. This capability is established in addition to the PLC LAN capability made available by use of the communication enabled power monitoring and control device described herein. The use of either the communication enabled power monitoring and control device or the power switch unit (discussed below) without communication capability is dictated by cost considerations of the system. The selective use of these devices allows only the appropriate capabilities for the specified application location within the home or office, thus reducing the overall cost of use in the home or office environment.

The three units are:
A power switch unit (SW);
A data communication (Ethernet) enabled power switch unit (ETH); and
A master unit (MST).
The Power Switch Unit (SW)

The SW is one of the basic units of the presently preferred embodiment of the invention. The SW connects an appliance in the home or office to the power supply. The SW provides for the monitoring of power consumption with capability for remote control of the connected appliance through the Internet.

FIG. 1 is a block schematic diagram of an SW unit 100. The SW unit 100 has a power plug 103 that is connected to the AC power distribution lines 101 through a power meter and relay module 104. The relay in the power meter and relay module 104 provides the capability to remotely switch on or switch off the supply to the power plug 103. It also allows for controlling the power supplied to the plug where a power control module is included in the power meter and relay module 104. The power meter in the power meter and relay module 104 monitors the power usage by the appliances connected to the power plug. The power meter and relay module 104 is connected via bi-directional communication links 106 to a microcontroller (MCU) 107, such as an Intel 8051. The microcontroller accepts the information on the power usage and compiles it prior to transfer to the broadband communication module 109. The power meter in the power meter and relay module 104 continuously monitors the flow of power to the power plug 103 and feeds the information to the MCU 107 through the communication links 106. The power usage information is compiled by the MCU 107 and sent to a broadband communication module 109 via communication links 108 that are connected to a UART enabled port on the communication module 109.

The communication module 109 modulates the received information to a communication data stream for transmission over a broadband communication frequency band that is typically used for power line communication (PLC) over the AC power distribution lines within a local area network (LAN). The typical broadband used as a PLC communication band in the 2 to 30 MHz range and provides up to a 200 Mbps data rate. The communication module 109 sends out the modulated data stream over a broadband connection 110 to a coupler filter 111 which is connected to the AC power distribution lines 101 by power line connections 112. The coupler filter acts as a bi-directional high pass filter that filters out energy in the power line frequency from the communication module. The broadband communication module 109 also demodulates a communication stream that is received over the AC power distribution lines 101 to provide command and control instructions for power control to the MCU 107. The MCU 107 interprets any received command and control instructions and instructs the power meter and relay module 104 to control the power flow to the power plug 103.

The modulation scheme used by the communication module 109 can be, for example, any of orthogonal frequency division multiplexing (OFDM); 16 (4 bit/symbol), 64 (6 bit/symbol), 256 (8 bit/symbol), or 1024 (10 bit/symbol) QAM, where the symbols are defined based on specific QAM constellation; differential quaternary phase-shift keying (DQPSK); differential binary phase-shift keying (DBPSK); and robust modulation (ROBO). The data transmission rates using the broadband PLC of the SW 100 is up to 200 Mbps.

The power for the modules of the SW 100 is supplied by a power supply module (PSU) 113 that is connected to the AC power distribution lines by power connections 102. The PSU 113 generates the various supply voltages necessary for the modules of SW 100 and distributes them to the individual modules of the SW 100 through connections 114.

Figure 2:
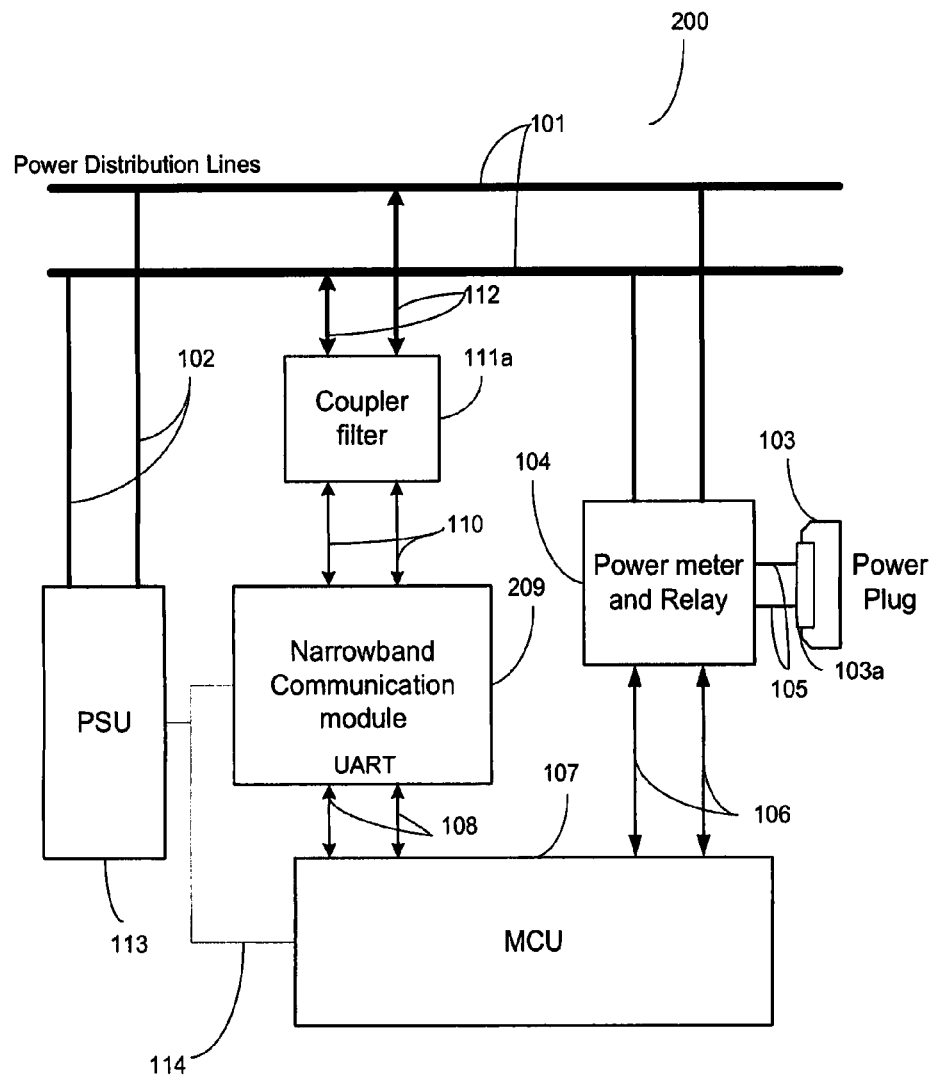
FIG. 2 is a block schematic diagram showing a SW having narrowband information transfer capability according to the invention.

FIG. 2 is a block schematic diagram showing an alternate embodiment of an SW unit 200. In this embodiment, the SW 200 uses narrowband modulation to transmit the information on power usage collected by the MCU 107 and sent to the narrowband communication module 209. The communication module modulates the information using the narrowband transmission frequency for transmission over the power lines 101 as a narrowband transmission instead of as broadband transmission used for PLC. In this embodiment, the narrowband transmission uses differential code shift keying (DCSK) for modulation of the information stream. Similar to the SW 100, control commands for the SW 200 are received by the narrowband communication module 209 over the power line 101 using narrowband transmission. A bidirectional band pass filter 111a is used between the AC power distribution lines 101 and the narrowband communication module 209 to limit the interference due the power line frequency and any PLC broadband communication frequency. The received commands are demodulated by the narrowband communication module 209 and supplied to the MCU 107. The MCU 107 then interprets the commands and sends the necessary instructions to the power meter and relay module 104 to enable, disable, or control the flow of power to the plug 103, based on the commands received. The narrowband transmission typically works with a bit rate of up to 7.5 Kbits/sec (kbps) over 200 to 400 kHz frequency band in the U.S. and up to 2.5 kbps over 95 to 125 KHz frequency band in some of the countries in Europe.

In the case of SW 100 and SW 200, there is no external communication interface. Hence, any configuration and software updates of the MCU and modules have to be accomplished via the AC power distribution lines using compatible communication connections.

Figure 3A:
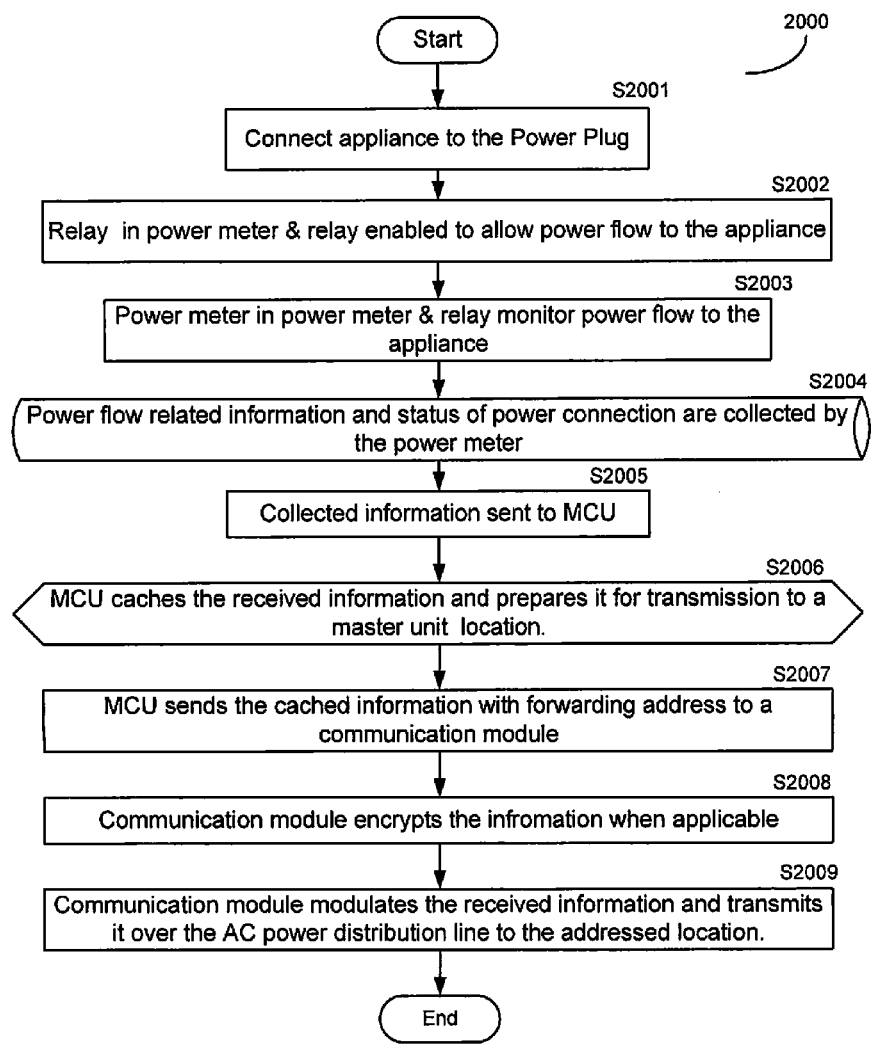
FIG. 3A is a flowchart showing the collection and transmission of information of power usage of the appliance and status of the power plug of an SW unit according to the invention.

FIG. 3A is a flowchart 2000 showing the operation of the SW 100 with regard to collecting and transmitting the power usage and power plug 103 status information when an appliance is connected to the power plug 103.

An appliance, such as but not limited to, a refrigerator, a washer, or an oven is connected to the power plug 103 (S2001).

The power plug 103 is enabled when the relay in the power meter and relay module 104 is closed (relay enabled). Power flows from the AC power distribution lines 101 supplying the home or office to the appliance through the power meter and relay module 104 and the noise filter 103a (S2002).

The power meter and relay module 104 monitors the power usage of the appliance by checking the power flow through the power meter and relay module 104 and the plug 103 (S2003).

The power usage information and the on state or off state of the relay and, hence power connection, are collected by the power meter in the power meter and relay unit 104 (S2004).

This collected information on the status of the power connection is passed on to an MCU 107 for compilation and consolidation (S2005).

The MCU 107 caches the received information. The MCU 107 compiles and consolidates the cached information making it ready for transfer to an MST (S2006).

The prepared information, ready for transfer to a master unit (MST) connected on the power distribution lines 101, is forwarded with the address of the MST to a communication module 109 (S2007).

The communication module 109 receives the information and address of an addressee from the MCU 107. The MCU 107 encrypts the information and combines the encrypted information with the address provided (S2008).

This encrypted information and address are then modulated by the communication module 109. The broadband modulation frequency band used, and the type of modulation are as defined in the descriptions of the SW (S2009).

The communication module 109 then sends this modulated information stream onto the AC power distribution lines 101 for transmission to the MST through a coupler filter 111, where the filter is used to block unwanted frequencies from entering and impacting the operation of the communication module 109 (S2010).

Figure 3B:
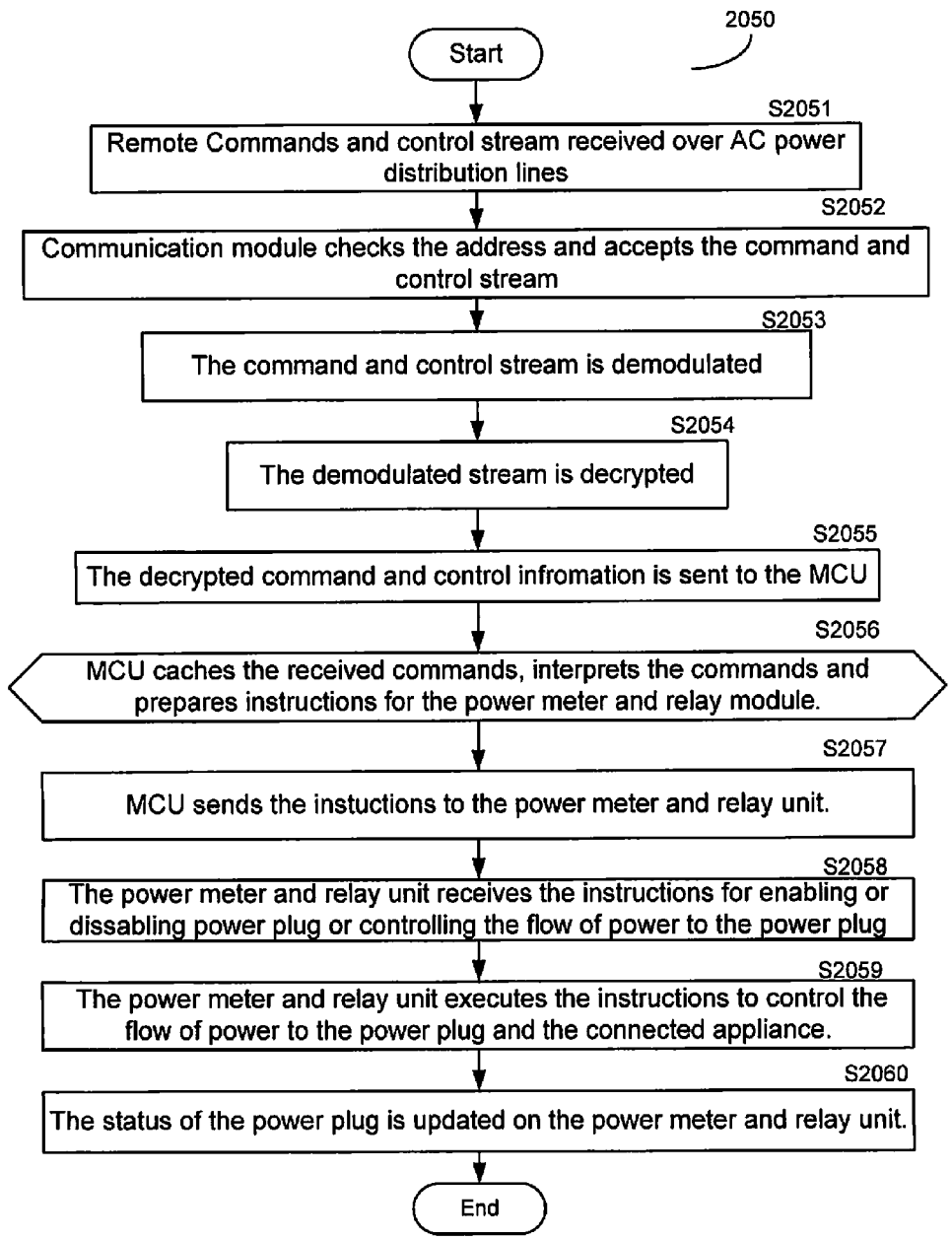
FIG. 3B is a flowchart showing remote control of the power in a power plug of an SW unit according to the invention.

FIG. 3B is a flowchart 2050 showing the operation of a SW 100 unit while providing for remote control of the power flow to a connected appliance, connected to the power plug 103. Any information or status changes due to a remote command and control stream are sent back over AC power distribution lines 101 as described in FIG. 3A.

The command and control input stream modulated by the correct transmission frequency to control the status and power flow through the SW 100 remotely is delivered over the AC power distribution lines 101 (S2051).

The command and control input stream is passed to the communication module 109 of connected SW 100 through the coupler filter module 111. The communication module 109 demodulates the command control input stream received (S2032).

The addressee of the received demodulated input stream is checked and, if found to be of the specific SW 100, the demodulated input stream is accepted by the SW 100 for further processing by the communication module 109 (S2053).

The demodulated command and control stream is decrypted in the communication module 109 to extract the associated command and control inputs for the SW 100 (S2054).

The extracted command and control inputs are passed to the MCU 107 for caching and interpretation (S2055).

The MCU 107 caches the inputs received and interprets them to generate a set of instructions for execution by the power meter and relay module 104. The interpreted instructions include, for example, instructions to enable the power flow to the power plug by engaging the relay or to disable the power flow to the power plug by disengaging the relay. If the power meter and relay 104 include power control circuitry, specific control instructions on power input to the connected appliance (S2056).

The generated instructions are sent to the power meter and relay module 104 of the SW (S2057).

The power meter and relay module 104 receives the instructions sent by the MCU 107 for power flow control to the connected appliance (S2058).

The power meter and relay module 104 acknowledges the instructions from the MCU 107, executes the instructions received to enable, disable, or otherwise control the power flow to the connected appliance connected to the power plug 103 (S2059).

The status of the relay and the power usage of the connected power plug 103 are updated on the power meter, and relay module 104 and updated power usage and relay status is sent to MCU 107 for communication back to the initiating remote sites (2060).

The Data Communication (Ethernet) Enabled Power Switch Unit (ETH)

The ETH is the second unit of the invention. This unit allows an appliance in the home or office to be connected to the power supply through the ETH and provides for the monitoring of power consumption with capability for remote control of the connected appliance. The ETH further provides the capability for broadband PLC based data communication, where the data and communication devices are connected to the power distribution line through a communication port, typically an Ethernet port on the ETH. Multiple ETH units can be used to establish a PLC based local area network (LAN).

Figure 4:
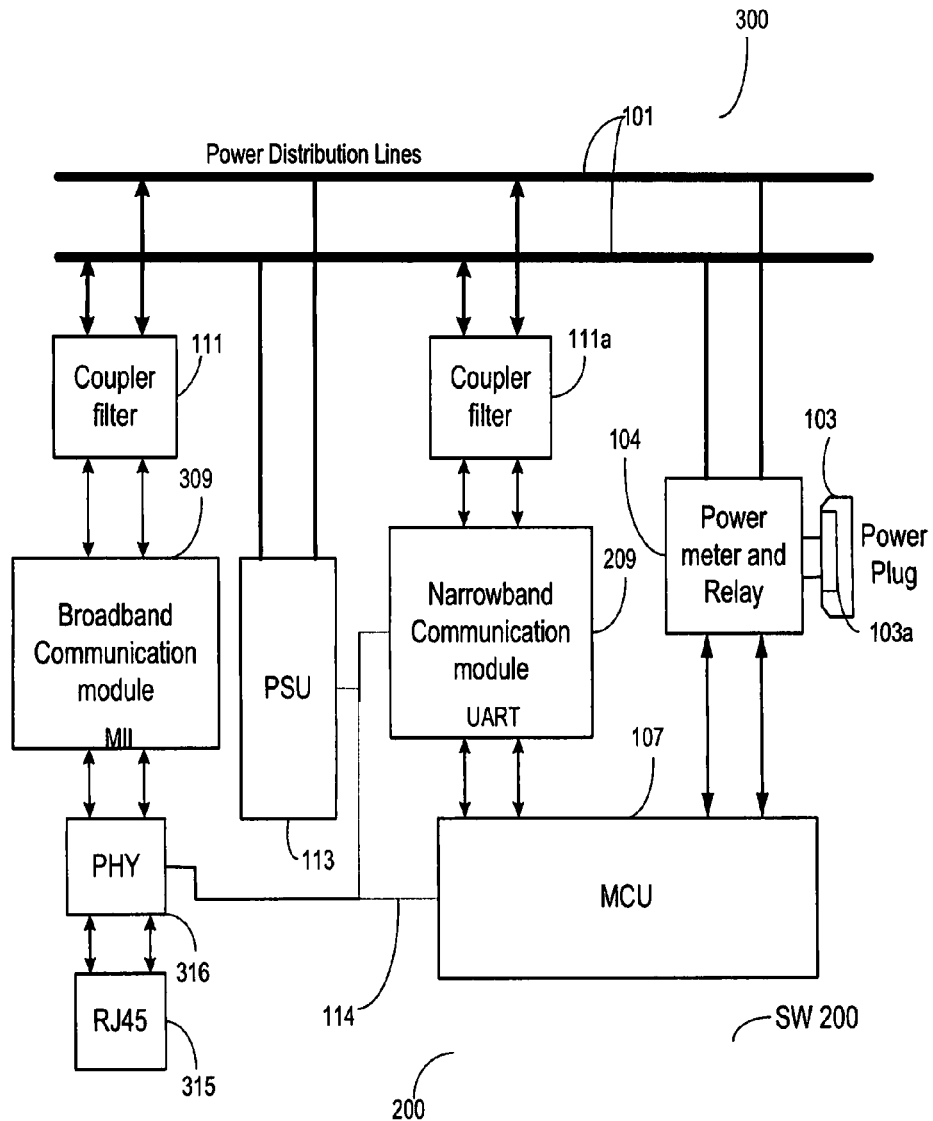
FIG. 4 is a block schematic diagram showing a data communication enabled power switch unit (ETH) having broadband for PLC and narrowband for monitor and control information transfer according to the invention.

FIG. 4 is a block schematic showing the ETH unit 300. The ETH 300 is a combination of two sub-units: a broadband PLC sub-unit, and a SW sub-unit similar to the SW 100 or SW 200. The SW sub-unit ETH 300 uses the sub-unit SW 200 with narrowband communication for information transfer on power usage and remote control of connected appliances over an Internet connection. The broadband PLC Ethernet bridge adaptor sub-unit is a 200 Mbps communication sub-unit for broadband sharing, including on line gaming, Voice over internet protocol (VOIP), Internet protocol television (IPTV), and audio and video streaming.

The ETH 300 block diagram in FIG. 4 shows all necessary PLC broadband communication modules and modules of the SW 200 as independent sub-units. The block diagram of the SW 200 sub-unit is substantially the same as that shown in FIG. 2, but with narrowband information transfer capability. The operation of the SW 200 sub-unit of the ETH 300 is as described for the SW 200.

The broadband communication sub-unit of the ETH 300 comprises a connector, typically of a RJ45 connector 315 or similar, for CAT5 Ethernet cable, which is used as a broadband communication I/O connector into the ETH 300. The RJ45 connector 315 is connected through a physical layer interface (PHY) module 316 to a media interface input (MII) on a broadband communication module 309. The communication module 309 converts the analog input into a data stream meeting the PLC broadband protocol. In this embodiment, the PLC communication protocol uses a transmission frequency band of 2 to 30 MHz, and a modulation scheme for the data stream using one of OFDM, QAM 1024/256/64/16, DQPSK, or ROBO. The communication module also handles the optional encryption, typically using a 128 bit or larger advanced encryption standard (AES). The modulated data stream is then passed on to the main power distribution lines 101, through a coupler filter module 111. The filter module acts a bidirectional high pass filter to prevent the narrowband frequency and the power line frequency from entering the PLC broadband communication module 309 and generating noise. The AC power distribution lines 101, when connected to multiple ETH units, form the LAN within a home or office for PLC data communication and streaming media transfer. Because the broadband communication elements are bidirectional, the broadband communication module can send and receive full duplex broadband communication to any communication device connected to the RJ45 connector 315. The broadband communication module is also enabled with a unique address so that communication to it and from it can be identified and selectively allowed to pass through to the connected video or audio communication unit attached to the RJ45 connector. The received data stream having a right address is decoded and decrypted, if needed, based on the address. The communication module 309 also converts the received data stream into the analog format and sends it through the MII interface of the communication module 309 to the PHY 316, to the RJ45 module 315, and to the connected customer device. The disclosed use of broadband communication within the PLC LAN using the ETH 300 units enables streaming media and IPTV delivery capability to connected display devices, connected to appropriate communication units within the PLC LAN.

Figure 5:
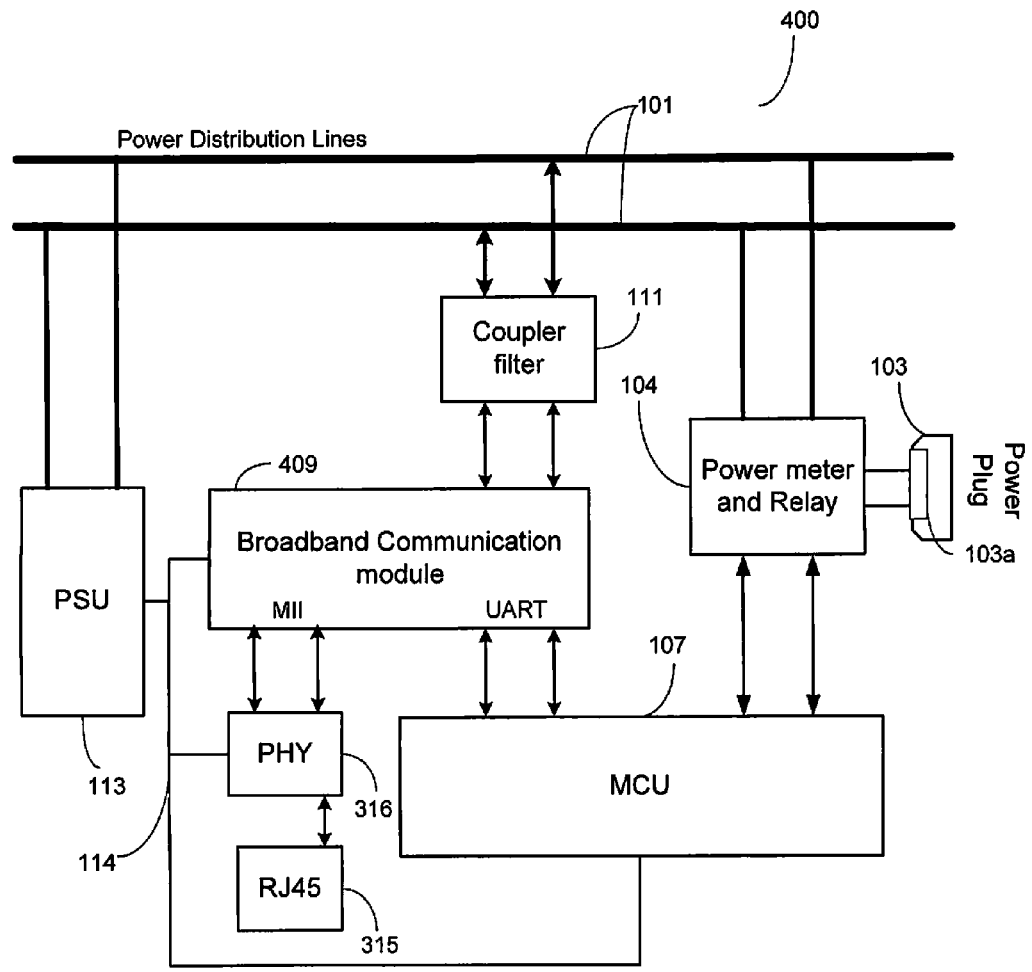
FIG. 5 is a block schematic diagram showing an ETH having broadband for PLC and for monitor and control information transfer according to the invention.

FIG. 5 is a block schematic diagram of an alternative embodiment of an ETH unit 400. The ETH 400 implementation shown in FIG. 5 also provides data communication capability and power monitoring and control capability. The ETH 400 uses the broadband communication frequency band and modulation used by the PLC data communication for data communication and for transfer of information regarding power monitoring and control. The elimination of the narrowband for power monitoring and control within the LAN reduces the complexity and cost of the system.

In FIG. 5, the communication subunit comprises a RJ45 connector 315 connected through the PHY 316 to a MII port on the communication module 409. The power monitoring and control information of the associated power plug 103 is collected by the power meter and relay unit 104 and sent to an MCU 107. The information is cached and processed by the MCU 107 and then passed to the broadband communication module 409 through a second port, UART enabled, on the communication module 409. The communication module 409, in this case, is common for communication and for power usage and status information transfer and control. Here, the communication module 409 converts the incoming data stream into the broadband format used for PLC. The switch sub-unit of the ETH 400 operates in a manner similar to that of the SW 100. The power usage and power plug status information collected by the power meter and relay module 104 are also passed through the MCU 107 to the broadband communication module 409 for conversion to an output information stream using the broadband PLC format. Both the data stream and the power usage and status information stream are then transferred from communication module 409 to the power distribution lines 101 in the home or office through the coupler filter module 111. Similarly, the communication module 409 receives the incoming communication data streams and the command and control instructions to the ETH 400 and passes them to the respective modules of the ETH 400 for processing.

In this embodiment, the PLC communication protocol uses a transmission frequency band of 2 to 30 MHz, and a modulation scheme for the data stream using one of OFDM, QAM 1024/256/64/16, DQPSK, or ROBO. The communication module also handles the optional encryption, typically using a 128 bit advanced encryption standard (AES) prior to modulation. The modulated data stream is then passed on to the main AC power distribution lines 101 through a coupler filter module 111. The filter module acts a bidirectional high pass filter to prevent the power line frequency from entering the PLC broadband communication module 409 and generate noise. The AC power distribution lines 101, when connected to multiple ETH units, form the LAN within a home or office for PLC data communication.

The broadband communication module 409 is also enabled with a unique address so that communication to it and from it can be identified. Because the broadband communication elements are bidirectional, the broadband communication module can send and receive full duplex broadband communication to any communication device connected to the RJ45 connector 315. Similarly, the communication module 409 can also send out information streams comprising the power usage and status of the plug to the AC power distribution lines 101, and it can receive command and control information streams from the AC power distribution lines 101. The received data and command and control information streams are decoded, the address is checked to see if correct and decrypted, if needed, based on the address. The communication module 409 then converts the received data stream into the analog format and sends it through the MII interface of the communication module 409 to the PHY 316, to the RJ45 module 315, and to the connected customer device. Similarly, the communication module sends the command and control information to the MCU 107 for interpretation. The MCU 107 then generates instructions to the power meter and relay module 104 that are used by the power meter and relay module 104 to control the power flow to the power plug 103. The power plug includes a noise filter 103a that eliminates any noise transfer between the appliance connected to the power plug 103 and the power meter and relay module 104.

The use of multiple ETH 400 units within a home or office enables PLC LAN connectivity within the home or office. Here, also the disclosed is the use of broadband communication within the PLC LAN, using the units, to enable streaming media delivery capability and IPTV delivery capability to connected display devices, connected to appropriate communication units within the PLC LAN.

The power supply to the plug 103 is from the power distribution lines 101 through the power meter and relay module 104. The status of the relay and the power monitoring information are collected by the power meter and relay module 104 and passed to the MCU 107, which transfers the information collected to the communication module 409 via a second port with a UART or MII on the communication module 409. This information is also converted by the communication module 409 into the broadband format used for PLC and transferred to the power distribution lines 101 through the coupler filter module 111.

Figure 6:
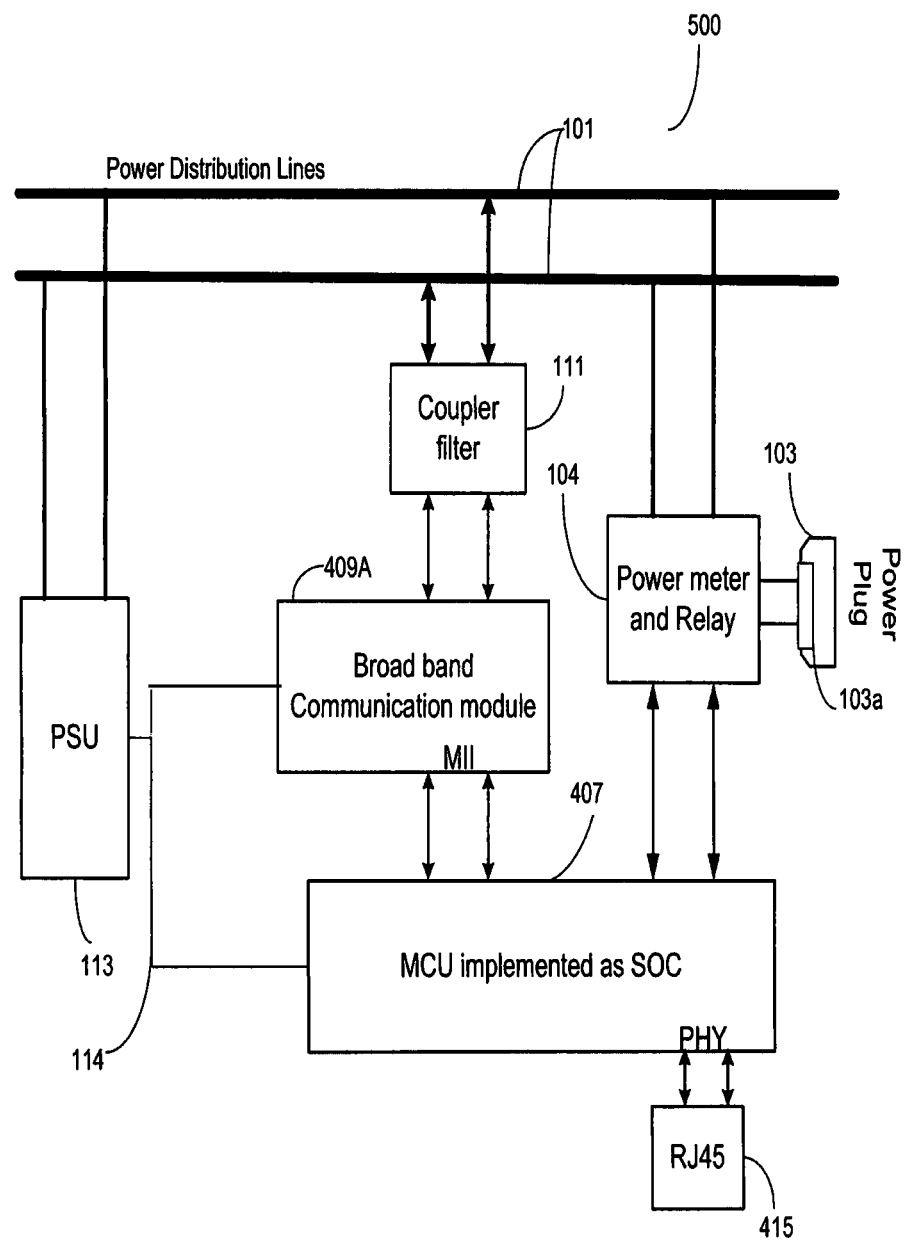
FIG. 6 is a block schematic diagram showing an ETH having broadband for PLC and for monitor and control information transfer according to the invention.

FIG. 6 is a block schematic diagram showing another embodiment of an ETH 500. This embodiment comprises a variation of the ETH 400 in that both the ETH 400 and the ETH 400A use broadband PLC band for enabling communication within the LAN and for transfer of power usage information from, and command and control to, the power meter and relay, for power supply to the connected appliance. The difference between the two embodiments is that in the ETH 400A the MCU 407 is implemented as a system on chip (SOC) with integrated PHY and a port on the MCU for connection of the RJ45 connector 415. This means that the communication path to and from the connected communication and display unit is through the RJ 45 connector 415 to the MCU 407, and through the MCU 407 to the broadband communication module 409A. The path for the power monitor and control information is from the power meter and relay unit 104 to the MCU 407 and from the MCU 407 to the broadband communication module 409A through the same port that is used for the data transfer. The broadband communication module 409A processes the data to produce a data stream and processes the monitored information to produce an information stream having similar encryption and modulation characteristics. These streams are then transferred to the AC power distribution lines through the coupler filter module 111 for distribution. Each of the modules of the ETH 400A are bidirectional and allow data stream and control information to be received by the communication module. The communication data extracted is distributed to the connected communication device through the MCU 407, and then through the RJ45 connector 415. The control information extracted is passed to the MCU 407 for caching and interpretation, and the generated instructions are sent to the power meter and relay module 104, where they are executed to manage the power flow to the connected appliance through the power plug 103. In FIG. 4A with regard to the ETH 400A, even though the communication channel or path is through the MCU 407, which is implemented as an SOC, in the typical case this MCU 407 does not participate in the data conversion process, but it does provide the possibility within the MCU to store, process, or modify the data if it is required.

Figure 7:
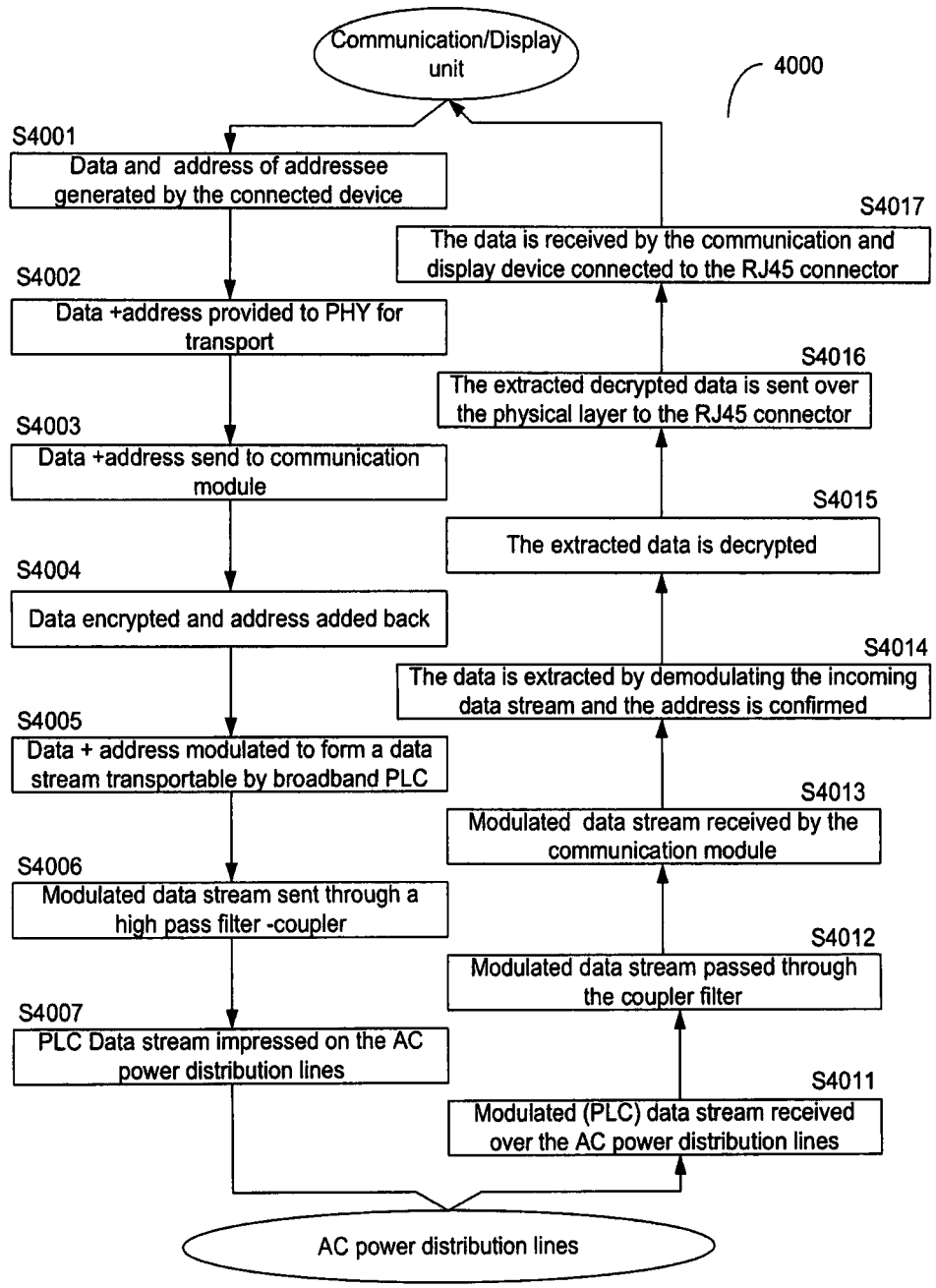
FIG. 7 is a flowchart showing operation of the ETH communication sub-unit according to the invention.

FIG. 7 is a flowchart 4000 showing a typical duplex communication operation of the ETH 400 shown in FIG. 5. Data generated by the ETH 400 is converted to a modulated data stream for sending to the addressee, and sent using the broadband PLC over AC power distribution lines; and an incoming data stream addressed to the ETH 400 is received by the ETH 400, and the data extracted and sent to the communication or display device associated with the addressed ETH 400. Thus, thee communication sub-section of the ETH 400 is a duplex communication sub-unit.

A data input and address of an addressee are generated by the communication/display device (external to the unit) connected at the RJ45 connector 315 (S4001).

The data plus address are passed on to a PHY 316 to be sent over the physical layer to a communication module 409 (S4002).

The communication module 409 accepts the incoming data and address of the addressee (S4003).

The communication module 409 encrypts the data received. The encryption is done with a 128 bit or higher bit AES for security (S4004).

The communication module 409 modulates the encrypted data stream with the address for transmission over the broadband PLC channel. The typical modulation schemes used is one of OFDM, QAM 1024/256/64/16, DQPSK, or ROBO modulation, to be sent using the broadband PLC transmission frequency band of 2 to 30 MHz and a data rate of up to 200 Mbs (S4005).

The modulated data stream is sent to the coupler filter module 111, which is used to connect the communication module output to the AC power distribution lines covering the home or office forming the LAN. The filter in the coupler filter module 111 is a bidirectional high pass filter that blocks any narrowband frequencies and power line frequencies from impacting the operation of the communication module (S4006).

The data stream is passed on to the AC power distribution lines 101 of the home and office for onward transmission to the addressee using broadband PLC (S4007).

Similarly, in the opposite direction, a modulated data stream is received over the broadband PLC for an ETH 400 (S4011).

The received modulated data stream is passed through a coupler filter module 111 that blocks any unwanted lower frequencies from entering the communication module creating unwanted noise (S4012).

The modulated stream received by the communication module 409 of the ETH 400 (S4013).

The received modulated data stream is demodulated and address verification is done by the communication module 409 (S4014).

The demodulated data stream is decrypted by the communication module 409 (S4015).

The decrypted data is passed to the PHY 316 to be sent through the RJ45 connector 315 (S4016).

The data sent through the RJ45 connector 315 is passed to the external communication and display device connected to it (S4017).

The Master Unit (MST)

The MST is the third basic unit of the invention and provides the computing power and storage capability necessary to collect and compile power consumption information provided to it. The connected SW units and ETH units within the home or office monitor the power usage of devices and appliances connected to their respective power plugs. This information is sent over the local power distribution lines in the home or office to the MST for compilation of data on usage. With the capability and computing power available the MST, with the proper software, can exert local and emergency control of the appliances connected to the SWs and ETH units. The MST also acts as a gateway connecting to the broadband communication modem to enable a communication pathway to the Internet cloud (wide area network [WAN] cloud).

Figure 8:
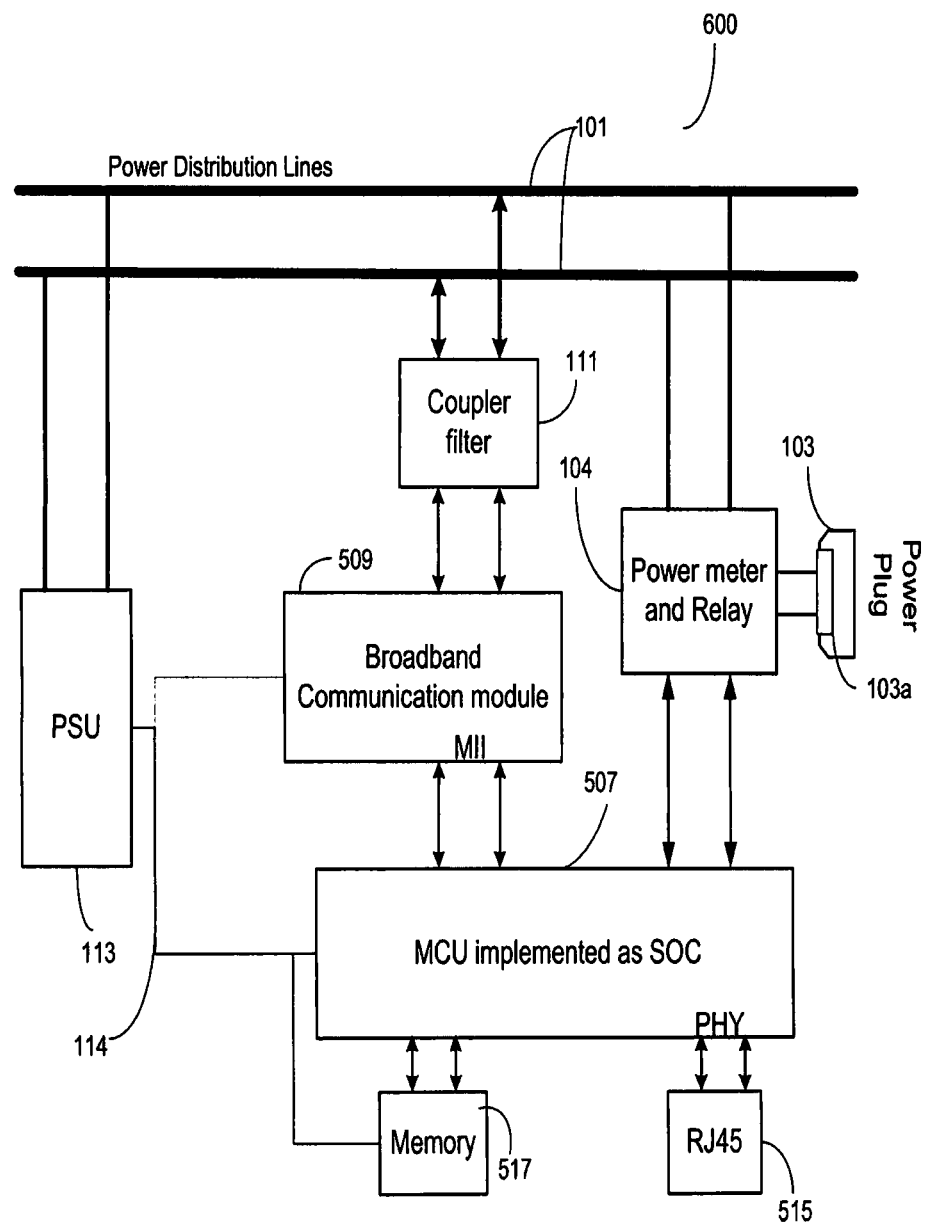
FIG. 8 is a block schematic diagram showing a master power switch module (MST) having a broadband connection for Internet and PLC and for monitor and control information according to the invention.

FIG. 8 is a block schematic diagram of an MST 600. In this embodiment, a 32 bit MCU is implemented as a system on chip (SOC) 507. The SOC 507 implementation provides for higher processing power and integration of modules with the MCU. The SOC 507 integrates a PHY into the MCU, providing an RJ45 connector 515 that connects the customer's modem device directly to a port on the SOC 507. This connection is a 10/100 base TX, auto-negotiation Ethernet port that provides the gateway to the Internet through a connected modem for the PLC communication from all the connected ETH units within the PLC LAN. The typical communication module of the MST 600 uses any one chosen modulation scheme from the list of modulation protocols comprising OFDM, QAM1024/256/64/16, DQPSK, DBPSK, and ROBO for sending and receiving communication data streams to the connected ETH units within the PLC LAN. The frequency band used for broadband PLC within the LAN is 2 to 30 MHz with a data transfer rate of up to 200 Mbps. The gateway provided by the MST 600 is also used to send out the collected and processed information on the power usage, as well as the status of the power monitoring and relay units within the PLC LAN for enabling control of the power plug 103. Any remote control commands are received from the web via the gateway provided by the MST 600 for transfer to connected SW 100 units for control of the power flow to connected appliances.

In the case of the MST 600 shown in FIG. 8, the modulation, frequency band, and data rates are the same as those used for the information and command transfer within the LAN. The SOC 507 is enabled to enforce all communication related security protocols associated with the PLC LAN. Further, all data and power monitoring and control information is sent to the SOC 507 by the connected SW 100 and ETH 400, or ETH 500 units within the home or office, via the power distribution lines 101 through the coupler filter module 111 and the communication module 509. The communication module 509 of the MST 600 demodulates the incoming streams and to decrypt them prior to transferring them to the MCU forming part of the SOC 507. The SOC 507 receives the information and processes it, by compiling and consolidating it, for outward transmission to the web. The SOC 507 also has a memory 517, typically connected to a memory port on the SOC 507. The memory 517 enables the SOC 507 to store the received power monitoring and control information prior to processing and compiling the information. The memory 517 also stores the compiled information to transmit it out through the gateway optimally when the bandwidth usage for data communication is low. The memory 517 also stores the transaction history with a time stamp for the data communication, power usage information transmitted out, and incoming remote commands sent to the connected SW 100 and ETH 400 or ETH 500 units within the home or office. The memory 517 provides for tracking of performance and remote debugging capability with pinging and path tracking capability for the MST 600, as well as the connected SW 100 and ETH 400 or ETH 500 unit.

The MST 600 provides a power plug 103 connected to the power distribution lines 101 through a power meter and relay 104 for connecting any needed appliance with the necessary power monitoring and control capability. This monitored information is sent to the MCU implemented as an SOC 507 to be combined with the information received over the PLC LAN over the power distribution lines 101 through the coupler filter module 111 and the communication module 509. This collected information forms part of the power monitoring information input to the MST 600. The power monitoring information is stored in the memory and compiled and processed for transmission to the monitoring sources in the WAN cloud through the modem connected to the SOC 507 port with the RJ45 connector 515. The transfer of the compiled information is typically done as a store and forward manner with storage in the memory 517 to enable best use of the available band width of the gateway, as discussed earlier.

Remote control commands from the gateway are received through duplex port with the RJ45 connector 515 from the connected modem. These control commands are interpreted by the SOC 507 of the MST 600 and sent to the respective SW 100 or ETH 400 or ETH 500 units to which it is addressed over the broadband PLC LAN through communication module 509 and coupler filter module 111 for necessary action at the addressed receiving units.

Figure 9:
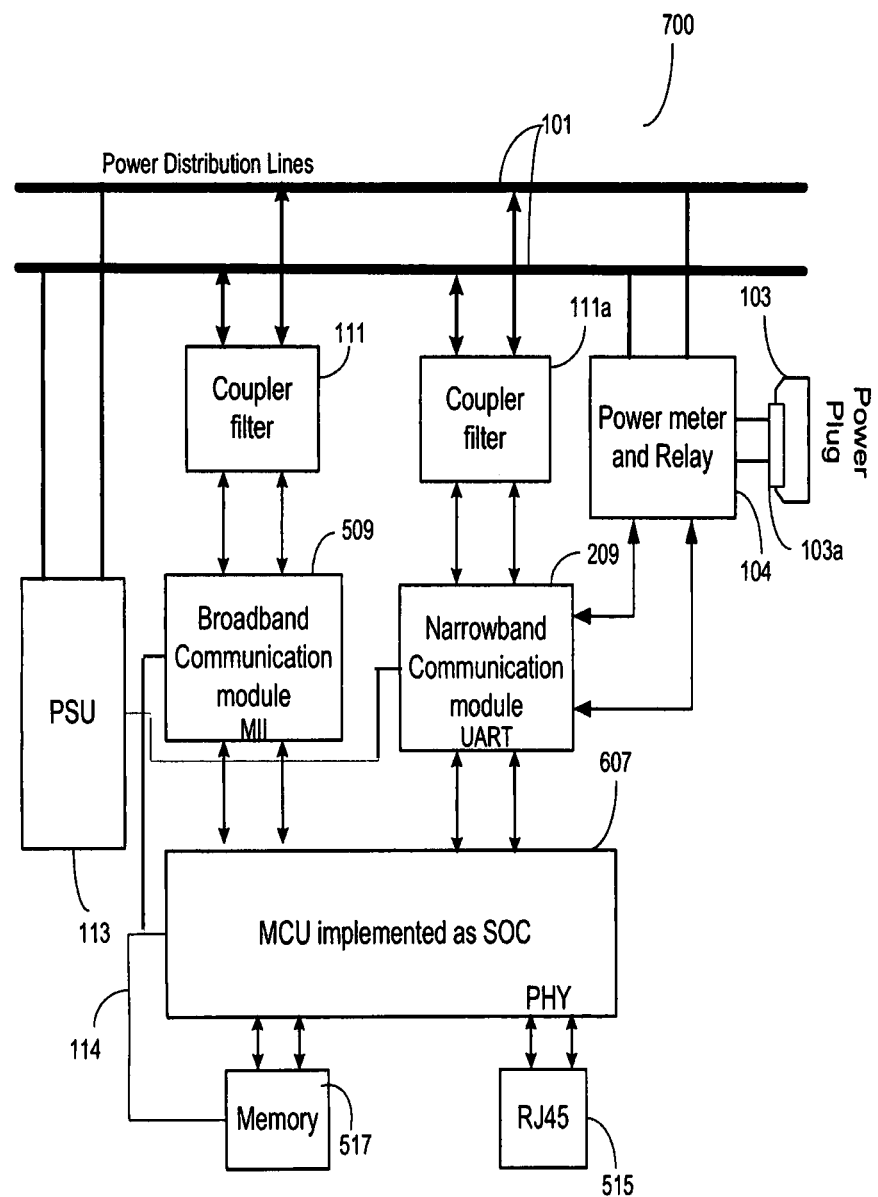
FIG. 9 is a block schematic diagram showing an MST having a broadband connection for Internet, PLC for data, and a narrowband connection for monitor and control information according to the invention.

FIG. 9 is a block schematic diagram showing an alternative embodiment of the MST 700. This embodiment also uses a 32 bit MCU manufactured as a SOC 607. A key difference between the previous implementation of the MST 600 and this implementation of the MST 700 is that the MST 700 is enabled for use with narrowband transmission and reception of power monitoring and control information, and broadband for power line data communication. This separation is at times advantageous, especially when the available broadband bandwidth for data communication is limited and necessary for data communication within the PLC LAN. Once the collected information is received by the SOC 607, it is compiled, stored, and transmitted out to the modem via the RJ45 connector 515 on the SOC 607, as in the previous case of MST 600. Remote control commands are received by the SOC 700 and transmitted back to the respective connected SW 200 and ETH 300 units with narrowband capability over narrowband communication channel. Data communication is handled using broadband PLC channel over the power distribution lines, as in the case of MST 600.

The MST 700 also has a plug 103 connected through a power meter and relay 104. The power meter and relay 104 monitors and control the power supply to any device connected to the plug 103. The monitored power usage information is fed to the 32 bit MCU implemented in the SOC 607. Monitored power information from other SW 200 and ETH 300 units is sent over the power distribution lines 101 using narrowband communication formats, to be received by the narrowband communication module 209. A coupler filter module 111a, containing a band pass filter, prevents power frequency and broad band frequency coupling to the narrowband communication module 209. The narrowband communication module 209 demodulates, decrypts, and extracts the information from the communication stream and supplies it to the MCU in the SOC 607. The received information is combined with the local information and stored in the memory 517 prior to processing. This stored information is retrieved, consolidated, compiled, and processed by the MCU 607, and stored back in the memory. When band width is available, based on predefined criteria, the compiled and processed information is retrieved from the memory and transmitted out to the appropriate site in the WAN cloud through RJ45 connector 515 and the modem attached to it.

Any remote commands received via the gateway are received through the RJ45 connector 515 from the connected modem. These control commands are interpreted by the SOC 607 of the MST 700 and sent to the communication module 209 to be converted to the narrowband transmission format, with encryption and modulation, for sending over the power distribution lines 101. The commands are then sent through the coupler filter 209 to the power distribution lines 101 to be sent to the respective narrowband enabled SW 200 or ETH 300 units to which it is addressed for necessary action at the receiving units.

The MST 700 also acts as the gateway for communication, linking the PLC LAN system with the WAN cloud. The connected ETH 300 units connected to customer communication devices send data streams over the power distribution lines 101 using a PLC specific broadband format which has been described earlier. The communication module 609 of the MST 700 receives the data streams, demodulates and decrypts the data stream, and extracts the data. This is sent to the MCU integrated into the SOC 607 where it is checked for permission. The data is then sent to the modem connected to the RJ45 connector 515 for transport over the Internet. Because all of the data communication modules 509 are bi-directional, the MST can receive data from the Internet through the connected modem and direct the data to the appropriate ETH 400 units over the PLC LAN.

Figure 10:
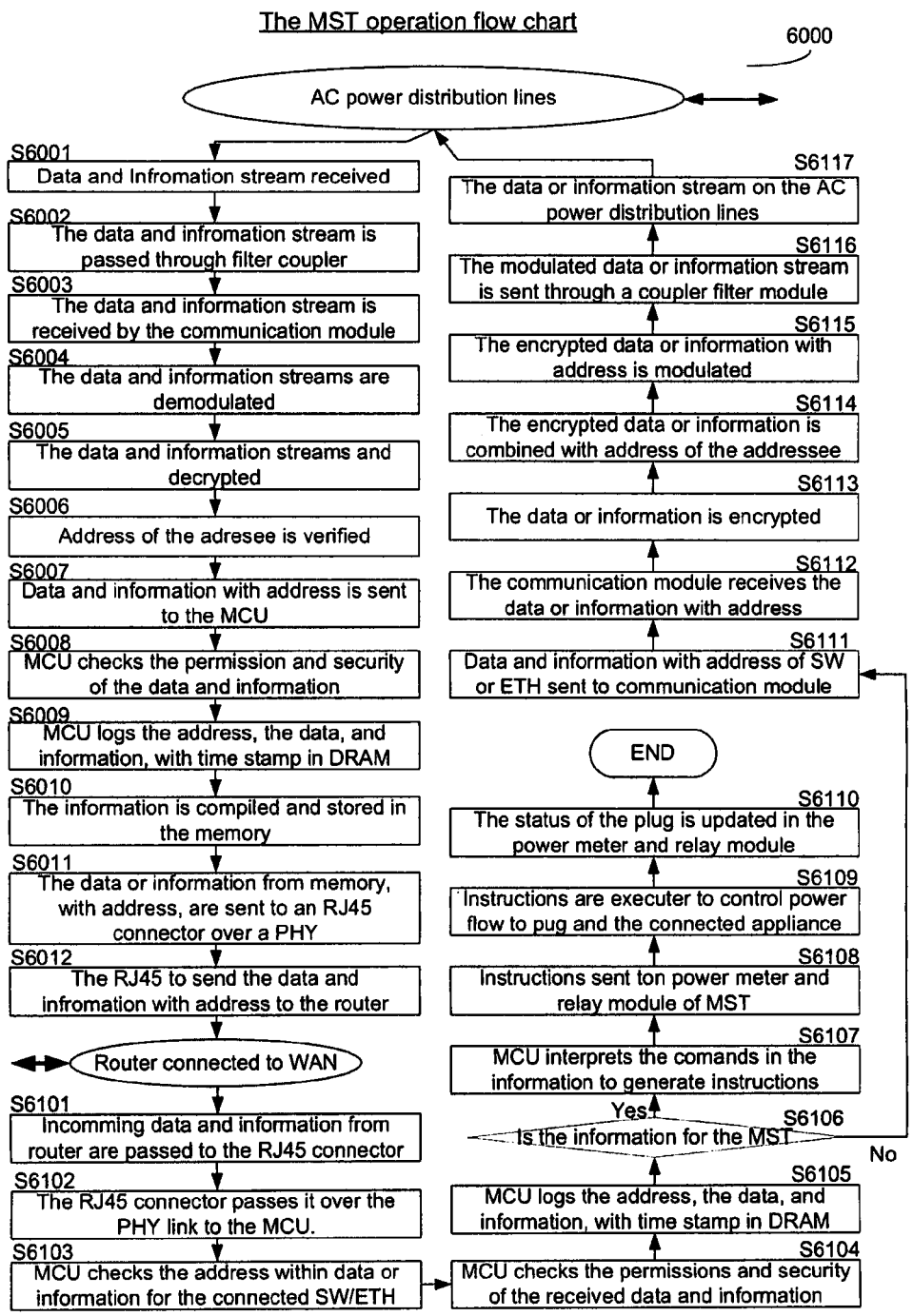
FIG. 10 is a flowchart showing operation of the MST for establishing WAN connections for data communication and monitor and control information according to the invention.

FIG. 10 is a flowchart 6000 showing normal duplex operation of the MST 600 enabling data communication and information transfer, to and from the router to the AC power distribution lines 101 for transport over the Internet.

The MST receives incoming data and information stream over the AC power distribution lines 101 (S6001). The data stream and information stream are transmitted over broadband PLC for MST 600. Where, as in the case of the MST 700 (for which no flowchart is shown), the data stream is transmitted over broadband, PLC and the information stream is transmitted over narrowband, as previously described.

The received data and information streams are passed into the MST through filter couplers (S6002). The coupler filter module 111 of the MST 600 has a high-pass filter that blocks the power frequency from entering the communication module of the MST 600 and contributing to noise. In the MST 700, the broadband PLC data communication stream is passed through a high-pass filter in the filter coupler 111 that blocks the power frequency and the narrowband frequencies from entering the broadband communication module 509. The narrowband information stream passes into the MST 700 through a band-pass filter in the filter coupler 111a that blocks both the broadband frequencies and the power frequencies from the narrowband communication module 209.

The received communication and information streams are received by the communication module (S6003). The MST 600 has a single broadband communication module 509 to handle both the communication data stream and the information stream. The MST 700 has a broadband communication module 509 for the broadband data communication steam and a narrowband communication module 209 for the information stream.

The communication module demodulates the streams to extract the data, the information, and the addresses (S6004). The MST 600 contains only a single broadband communication module 509 that demodulates the data communication stream and information stream. The MST 700 has a broadband data communication module 509 for the data stream and a narrowband communication module 209 for the information stream.

The communication module decrypts the stream (S6005). In the MST 600, the broadband communication module 509 decrypts the demodulated stream. In the MST 700, the data communication stream is decrypted by the broadband communication module 509, while the information stream is decrypted by the narrow band communication module 209.

The address associated with the streams are checked by the decrypting communication module to verify the addressee (S6006).

The data and the information with the necessary address are sent to the MCU for logging and checking (S6007). The MST 600 has the MCU embedded as part of the SOC 507, and the MST 700 has the MCU as part of the SOC 607.

The MCU checks the permissions and security of the data and information (S6008).

The MCU logs the address of the data and information, with timestamp and other approved details, in the DRAM buffer (S6009).

The logged information is consolidated, compiled, and stored in a memory 517 for establishing priority for transmission (S6010).

The data, or the prioritized information from the memory 517, with the address details is sent over a PHY for transport over the physical layer to the RJ45 connector 515 (S6011).

The data or information with the necessary address details is passed through to the router connected to the RJ45 connector 515 for transport over the Internet to the addressee (S6012).

In the reverse direction, when a return data or information stream comes from the Internet to the router connected to the RJ45 connector with the IP address of the MST, it is converted into data or information at the router and passed through the RJ45 connector 515 to the physical link connecting the RJ45 connector to the MCU (S6101).

The data or information comes over the PHY link to the MCU (S6102). In the case of the MST 600, the MCU is embedded in the SOC 507. In the case of the MST 700, the MCU is embedded in the SOC 607.

The receiving MCU checks the address within the data or information to determine if it is addressed to an ETH unit within the PLC LAN or an SW connected to it (S6103).

The receiving MCU further checks for all security and permissions of the received data or information that are needed to access the connected devices (S6104).

The receiving MCU logs the incoming data or information with timestamp and details in the DRAM (S6105).

The receiving MST checks to determine if any received information is addressed to the MST (S6106).

If the received is information addressed to the MST, then the receiving MCU interprets the commands within the information stream to generate executable instructions for the power meter and relay module 104 of the MST (S6107).

The receiving MCU sends the instructions to the local power meter and relay module 104 for action (S6108).

The local power meter in the power meter and relay module 104 executes the executable instructions to control the power flow to the power plug 103 through the relay in the power meter and relay module 104 of the MST (S6109).

The status of the local power plug 103 is updated in the power meter and relay module 104 (S6110).

If the received information is not for the MST, then the data or information, with the address of the SW or ETH is sent to the communication module of the MST (S6111). In the case of the MST 600, both data and information are sent to a broadband communication module 509. In the case of MST 700, the data is sent to the broadband communication module 509, while the information for power control is sent to a separate narrowband communication module 209.

The appropriate communication module receives the data or information and the address of the SW or ETH (S6112).

The communication module encrypts the data or the information received (S6113).

The encrypted data or information is recombined with the address of the SW or ETH (S6114).

The communication module modulates the data or information with the address to form a data or information stream (S6115). In the case of the MST 600, the data or information stream is modulated using the same broadband frequency using the modulation protocol chosen for the PLC LAN. In the case of MST 700, the data stream is modulated using the broadband frequency and modulation protocol used for PLC LAN, while the information stream is modulated using DCSK modulation using the narrowband modulation frequency.

The modulated streams are sent through a coupler filter module that blocks unwanted frequencies being impressed on the AC power distribution lines of home or office, and also prevents the unwanted frequencies on the AC power distribution lines entering the communication module (S6116). In the MST 600, the filter used is a high-pass filter in the coupler filter 111 that allows the broadband frequency to pass through. In the MST 700 for the modulated data stream using broadband, a high-pass filter in the coupler filter 111 is used and, for the modulated information stream using narrowband, a band-pass filter in the coupler filter 111a is used.

The coupler filter module impresses the modulated data or information stream on the AC power distribution lines 101 for transmission to the connected addressee SW or ETH (S6117). In the case of MST 600, the SW 100 and ETH 400 or ETH 500 are connected. In the case of the MST 700, using narrowband transmission for information, only the SW 200 and ETH 300 are connected.

Configuration and Software of the MST

The devices are configurable and managed through the web using hypertext transfer protocol (HTTP) or HTTP secure (HTTPS). The unit's operating system is compatible with, but are not limited to, Windows 98 second edition (SE), Windows millennium edition (ME), Windows 2000, and Windows XP. Firmware upgrades are provided via the local web using graphical user interface (GUI). Configuration file management provides for file upload and restore. The available protocols include, but are not limited to, IPv4 and IPv6 management protocol stacks. The MCU in SOC 507 in the MST 600 and MCU in SOC 607 in MST 700 are enabled to provide quality of service (QoS) for the units by prioritized random access, contention-free access, and segment bursting capability for data communication. It also provides prioritized channel access with internal packet prioritization. The MCU in SOC 507 and MCU in SOC 607 can assign priorities for both communication and power usage information transfer include emergency, high priority, and normal priority. The security and protection schemes include user name and password. The MST 600 and MST 700 are configurable for dynamic host configuration protocol (DHCP) client, static internet protocol (IP), and a proprietary configuration protocol referred to as Asoka host configuration protocol (AHCP). The default status is a predefined static IP with a subnet.

Time management of the units is by simple network time protocol (SNTP) with auto synchronization to the network time protocol server. The MST 600 and MST 700 both stores event logs in dynamic random access memory (DRAM) with buffer wraparound and event overwrite after a fixed number events to keep track of recent events. The buffer can be written into the external memory 517 for long term storage. Each event log has a format that includes timestamp, level, and event description. Both MST 600 and MST 700 are enabled to be reset without power cycling.

The MST 600 can support up to 64 SW 100 and ETH 400 or ETH 500 units that use only broadband. The MST 700 can only support 32 SW 200 and ETH 300 units that use narrowband transmission for information of power usage and for control of power plug 103 and broadband for communication.

In the Internet connection regimen, the MST 600 and MST 700 both have full multicast compatibility using Internet group management protocol (IGMP) for transmission and multicast listener discovery (MLD) for message identification. The MST 600 and MST 700 can convert any received multicast streams received into multiple unicast streams for transmission within the system to the appropriate connected SW and ETH units. The MSTs can fully manage the connected SW and ETH units, including getting device information and setting device information as necessary to establish a full device list for communication and control. The MST 600 and MST 700 can communicate and register with Internet servers and deal with any request for device information, as well as requests for setting device information from the servers to enable connections and debug.

The MST 600 and MST 700 both are able to support full debug capability by providing event log for debugging and ping from any host/IP with trace route from unit to host/IP. This availability of full connectivity through the MST 600 or 700 to each connected SW and ETH allow fast debug of the problems that can arise during operation.

Typical Connection for the Units within the Home or Office

Figure 11:
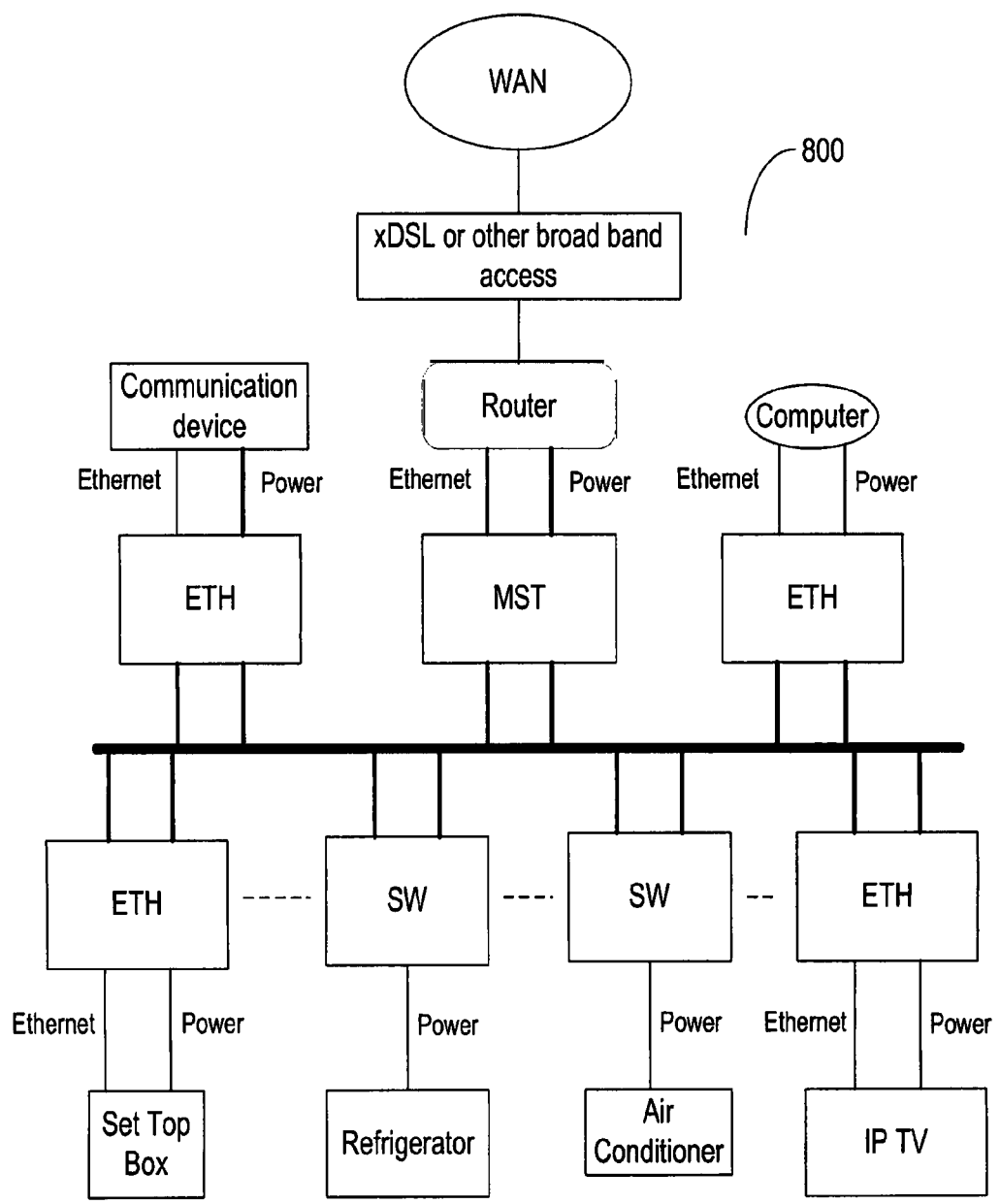
FIG. 11 is a block schematic diagram showing a typical connection for the various elements of the invention.

FIG. 11 is a block schematic diagram 700 showing powered management and communication connectivity using the three units of the invention. The SW units are used where the requirement is for power connection capability with monitoring and control but without the need to connect a communication device into the PLC LAN.

The ETH devices provide communication device connections to the PLC LAN while providing a power plug or power source which can be monitored and controlled.

Multiple SW and ETH units can be used to establish the power monitoring and control for the home and provide connectivity for data communication on the PLC LAN level.

The use of a single MST for the home provides the capability to establish a WAN gate way enabling the PLC LAN to communicate with outside world with security and connection rules. The MST is also used as a collection and compilation point for the power monitoring function, where the power usage within the home with connected SW and ETH units are received and compiled. Because there is connectivity with control capability on each SW and ETH unit, the power delivery through each of these SW and ETH units can be monitored and controlled from any of the communication devices connected to the PLC LAN. Further, this collected information on any of the power plugs can be accessed from the WAN cloud using connected communication devices to monitor the status and provide remote control commands through the WAN gate way. This capability is controlled by the permissions, authorizations and security rules established for connection into the PLC LAN through the MST.

Because communication connections to the outside world and within the PLC LAN are all broadband enabled, the system can provide steaming media capability within the PLC LAN. It can access and enable streaming media delivery to display devices connected using ETH units through the WAN gate way.

To facilitate macro level collection and compilation of power usage information, the collected power monitoring and usage information is transmitted over the WAN gateway to one or more central power usage collection units. These units collect the data for analysis and to provide input to the public bodies for making policy decisions on greenhouse gas reduction requirements.

A person skilled-in-the-art would readily appreciate that the invention disclosed herein is described with respect to specific embodiments of the units currently used. However, this should not be considered a limitation on the scope of the invention. Specifically, other implementations of the disclosed invention are envisioned and hence the invention should not be considered to be limited, to the specific embodiments discussed herein above. The units may be implemented as an assembly of individual components, as a combination of components and integrated circuits, or as one or more SOCs. The invention should not be considered as being limited in scope based on specific block level details, but should be considered on the basis of current and future envisioned functionality.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A power switch (SW) comprising:
a processor (MCU);
a power meter and relay module connected to a power distribution line;
a bidirectional communication link between the MCU and the power meter and relay module;
a coupler filter connected to the power distribution line;
a power plug having a noise filter that is connected to the power meter and relay module, wherein the power plug is configured to provide power to one or more appliances under control of the power meter and relay module;
wherein the power meter and relay module is configured to monitor power consumption information of the one or more appliances connected to the power plug;
a communication module connected between the coupler filter and the MCU, wherein the communication module comprises any of a broadband communication module or a narrowband communication module, and is configured to receive information over a power line communication network (PLC) over the power distribution line;
a power supply unit coupled to the power distribution line that is configured to provide power to the MCU and the communication module wherein the coupler filter comprises a bi-directional high pass filter that is configured to block unwanted power line frequencies from entering and impacting the communication module;
wherein the MCU is configured to receive the power consumption information over the bidirectional communication link from the power meter and relay module, compile the received power consumption information, and transfer the compiled power consumption information over the PLC network; and
wherein the SW has the capability to open the relay to switch off power to the power plug and the capability to close the relay to switch on power to the power plug;
wherein the communication module is configured to demodulate the received information to provide command and control instructions for power control to the MCU, and to modulate the compiled power consumption information for transfer over the PLC network;
wherein in response to receiving a command to control the power supply, the SW is configured to open or close the relay according to the received command; and
wherein the SW is configured to receive any of configuration or software updates over the power distribution line.

2. The SW of claim 1, wherein a local area network (LAN) is configured to use the PLC network within a particular premise;
wherein the communication module is further linked through a master switch (MST) to a wide area network (WAN) that exists outside of the premise; and
wherein the communication module is configured to send information outside of the premise, and to receive information from outside of the premise via the MST.

3. The SW of claim 2, wherein the SW is configured to provide remote control of an appliance connected to the power plug by responding to control commands received by the communication module; and
wherein the control commands originate from outside of the premise.

4. The SW of claim 2, wherein the SW is configured to provide the power consumption information for the one or more appliances connected to the SW to the communication module that is enabled to send the power consumption information over a LAN to a master switch (MST) which is further enabled to send the power consumption information over the WAN to a device outside the premise.

5. A communication enabled power switch (ETH) comprising:
a power meter and relay module;
a power plug having a noise filter that is connected to a power line communication (PLC) network through the power meter and relay module;
wherein the power plug is configured to control power flow through the power plug;
wherein the power meter and relay module is coupled to the power plug and is configured to monitor power consumption information of appliances that are connected through the power plug;
a broadband communication module coupled to the PLC network through a first coupler filter comprising a first bidirectional filter that is enabled to pass only frequencies used by the broadband communication module;
wherein the broadband communication module is configured to send and receive information and content over the PLC network;
wherein the content comprises any of online gaming content, voice over internet protocol content, internet protocol content, television content, or audio and video streaming content;
a voice, data and multimedia connector, connected to the broadband communication module to enable connecting communication and multimedia enabled appliances to the broadband communication module;
a narrowband communication module coupled to the PLC network through a second coupler filter;
wherein the second coupler filter comprises a second bidirectional filter that is enabled to pass the band of frequencies used by the narrowband communication module only, for transferring information on power usage, and for remote control of the one or more appliances;
a processor coupled at least to the power meter and relay module, to the broadband communication module, and to the narrowband communication module; and
a power supply unit, within the ETH, connected to the PLC network supplying power to the narrowband communication module, the broadband communication module and the processor;
wherein the first bidirectional filter and the second bidirectional filter are enabled to block unwanted frequencies from entering and impacting the operation of the respective broadband communication module and narrowband communication module; and
wherein the PLC network is configured as a local area network (LAN) and enabled to provide communication and streaming media capabilities within the LAN through the broadband communication module.

6. The ETH of claim 5, wherein the LAN is configured to use the PLC within a particular premise;
   wherein the narrowband communication module is further linked through a master switch (MST) to a wide area network (WAN) that exists outside of the premise; and
   wherein the narrowband communication module is configured to send information outside of the premise, and to receive information from outside of the premise through the MST.

7. The ETH of claim 6, wherein the ETH is configured to provide the power consumption information for the one or more appliances connected to the ETH, through the narrowband communication module that sends the power consumption information over the WAN to a device outside the premise.

8. The ETH of claim 5, wherein the ETH is configured to provide remote control of an appliance connected to the power plug by responding to control commands received by the narrowband communication module;
   wherein the control commands originate from outside of the premise.

9. The ETH of claim 5, wherein the ETH is configured to provide broadband PLC based data communication, wherein the communication and multimedia enabled appliances are connected to the power line through a communication port; and
   wherein multiple ETH units are connected via the power line to establish a PLC based LAN.

10. A system, comprising:
    an intelligent master sensor (MST) connected to a power line and to an associated appliance, wherein the appliance is powered by power from the power line under control of the MST, wherein the MST is configured to collect power usage information for the appliance and wherein the MST is further configured as a gateway to the internet to provide connectivity for communication and control;
    a plurality of sensors other than the MST, wherein the plurality of sensors includes
    a communication enabled power switch (ETH), and any of at least one additional ETH, or
    a power switch (SW);
    a power line communication (PLC) network established between the MST and the plurality of sensors;
    wherein each sensor of the plurality of sensors is connected to the power line and to a corresponding appliance;
    wherein each of the corresponding appliances is powered by power from the power line under control of a respective sensor of the plurality of sensors;
    wherein each of the respective sensors is configured to:
       collect power usage information of the corresponding appliance;
       transmit the collected power usage information to the MST over the PLC network;
       receive control commands over the PLC network from the MST; and
       switch power on and off to the corresponding appliance in response to the received control commands; and
    wherein the MST is configured to
       cache the collected power usage information received from each of the plurality of sensors,
       consolidate the cached power usage information with the power usage information for the appliance associated with the MST,
       transmit the consolidated information via a communication medium,
       receive instructions for effecting control of one or more of the appliances, and
       distribute control commands to one or more of the sensors to control the one or more appliances;
    wherein the plurality of sensors are configured to provide integrated sensing and control of appliance power usage and power management; and
    wherein the at least one ETH is further configured to provide broadband sharing through the PLC network, including any of online gaming, voice over internet protocol (VOIP), Internet protocol television (IPTV), and audio and video streaming; and
    wherein the at least one ETH includes:
       a power meter and relay module;
       a power plug having a noise filter that is connected to the PLC network through the power meter and relay module;
       wherein the power plug is configured to control power flow through the power plug;
       wherein the power meter and relay module is coupled to the power plug and is configured to monitor power consumption information of appliances that are connected through the power plug;
       a broadband communication module coupled to the PLC network through a first coupler filter comprising a first bidirectional filter that is enabled to pass only frequencies used by the broadband communication module;
       wherein the broadband communication module is configured to send and receive information and content over the PLC network;
       wherein the content comprises any of online gaming content, voice over internet protocol content, internet protocol content, television content, or audio and video streaming content;
       a voice, data and multimedia connector, connected to the broadband communication module to enable connecting communication and multimedia enabled appliances to the broadband communication module;
       a narrowband communication module coupled to the PLC network through a second coupler filter;
       wherein the second coupler filter comprises a second bidirectional filter that is enabled to pass the band of frequencies used by the narrowband communication module only, for transferring information on power usage, and for remote control of the one or more appliances;
       a processor coupled at least to the power meter and relay module, to the broadband communication module, and to the narrowband communication module; and
       a power supply unit, within the ETH, connected to the PLC network supplying power to the narrowband communication module, the broadband communication module and the processor;
       wherein the first bidirectional filter and the second bidirectional filter are enabled to block unwanted frequencies from entering and impacting the operation of the respective broadband communication module and narrowband communication module; and
       wherein the PLC network is configured as a local area network (LAN) and enabled to provide communication and streaming media capabilities within the LAN through the broadband communication module.

11. The system of claim 10, wherein:
    the LAN is configured to use the PLC within a particular premise;

wherein the MST is further connected to a WAN that exists outside of the premise; and wherein the MST is configured to send information outside of the premise, and to receive information from outside of the premise.

12. The system of claim 10, wherein the LAN is configured to use the PLC within a particular premise, wherein the MST is configured to receive control commands that originate from outside of the premise, and to deliver the control commands to the SW that responds to the remote control commands by switching on or switching off the corresponding appliance.

13. The system of claim 10, wherein the LAN is configured to use the PLC within a particular premise, wherein the MST is configured to send the power consumption information for the one or more appliances under the control of a sensor, wherein the power consumption information is sent over a wide area network (WAN) to a device outside the premise.

14. The system of claim 10, wherein the MST is configured to modulate the collected information to a communication data stream for transmission over a broadband communication frequency band to effect power line communication (PLC) over the power line within the local area network (LAN); and wherein the MST is configured to demodulate a broadband communication stream that is received over the power line to provide command and control instructions for power control of a power flow to the associated appliance.

15. The system of claim 10, wherein the MST is configured to modulate the collected information to a communication data stream for transmission over a narrow band communication frequency band to effect power line communication (PLC) over the power line within the local area network (LAN); and demodulate a narrow band communication stream that is received over the power line to provide command and control instructions for power control of a power flow to the associated appliance.

* * * * *